United States Patent
Khadloya et al.

(10) Patent No.: US 11,688,220 B2
(45) Date of Patent: Jun. 27, 2023

(54) MULTIPLE-FACTOR RECOGNITION AND VALIDATION FOR SECURITY SYSTEMS

(71) Applicant: INTELLIVISION TECHNOLOGIES CORP, San Jose, CA (US)

(72) Inventors: Krishna Khadloya, San Jose, CA (US); Manuel Gonzalez, San Jose, CA (US)

(73) Assignee: INTELLIVISION TECHNOLOGIES CORP., San Jose, CA (US)

( * ) Notice: Subject to any disclaimer, the term of this patent is extended or adjusted under 35 U.S.C. 154(b) by 118 days.

(21) Appl. No.: 17/200,611

(22) Filed: Mar. 12, 2021

(65) Prior Publication Data

US 2022/0292902 A1    Sep. 15, 2022

(51) Int. Cl.
| | |
|---|---|
| *G07C 9/37* | (2020.01) |
| *G06V 40/20* | (2022.01) |
| *G06V 40/16* | (2022.01) |
| *G06N 3/063* | (2023.01) |
| *G06N 3/08* | (2023.01) |
| *G08B 21/22* | (2006.01) |
| *G08B 27/00* | (2006.01) |

(52) U.S. Cl.
CPC ............... *G07C 9/37* (2020.01); *G06N 3/063* (2013.01); *G06N 3/08* (2013.01); *G06V 40/172* (2022.01); *G06V 40/20* (2022.01); *G08B 21/22* (2013.01); *G08B 27/005* (2013.01)

(58) Field of Classification Search
None
See application file for complete search history.

(56) References Cited

U.S. PATENT DOCUMENTS

| | | | |
|---|---|---|---|
| 9,922,477 B2 | 3/2018 | Kerning et al. | |
| 2001/0047488 A1* | 11/2001 | Verplaetse | G06F 21/32 |
| | | | 700/79 |
| 2015/0077235 A1* | 3/2015 | Pisz | G06F 3/017 |
| | | | 340/426.23 |
| 2018/0047272 A1* | 2/2018 | Chandraker | G06V 40/1347 |

(Continued)

OTHER PUBLICATIONS

"European Application Serial No. 22161687.3, Extended European Search Report dated Jul. 29, 2022", 12 pgs.

(Continued)

*Primary Examiner* — John F Mortell
(74) *Attorney, Agent, or Firm* — Schwegman Lundberg & Woessner, P.A.

(57) ABSTRACT

A security system can conditionally grant or deny access to a protected area using an artificial intelligence system to analyze images. In an example, an access control method can include receiving candidate information about a face and gesture from a first individual and receiving other image information from or about a second individual. The candidate information can be analyzed using a neural network-based recognition processor that can provide a first recognition result indicating whether the first individual corresponds to a first enrollee of the security system, and can provide a second recognition result indicating whether the second individual corresponds to a second enrollee of the security system. The example method can include receiving a passcode, such as from the first individual. Access can be conditionally granted or denied based on the passcode and the recognition results.

20 Claims, 12 Drawing Sheets

(56) References Cited

U.S. PATENT DOCUMENTS

| | | | |
|---|---|---|---|
| 2020/0201443 A1 | 6/2020 | Huang et al. | |
| 2020/0249764 A1* | 8/2020 | Page | G06F 3/017 |
| 2020/0342881 A1 | 10/2020 | Casado | |
| 2021/0201391 A1* | 7/2021 | Metev | G06Q 30/0645 |
| 2021/0209877 A1* | 7/2021 | Neill | G08B 7/06 |
| 2021/0350346 A1* | 11/2021 | Edwards | G10L 17/04 |
| 2022/0129577 A1* | 4/2022 | Joshy | G06F 40/205 |

OTHER PUBLICATIONS

Saypadith, Savath, "Real-Time Multiple Face Recognition using Deep Learning on Embedded GPU System", 2018 Asia-Pacific Signal and information Processing Association Annual Summit and Conference (APSIPA ASC), APSIPA Organization, (Nov. 12, 2018), 1318-1324.

* cited by examiner

MULTIPLE-FACTOR RECOGNITION AND VALIDATION FOR SECURITY SYSTEMS

BACKGROUND

Safety and security in home, office, and other settings is increasingly a concern for individuals, business owners, municipalities, and others. In addition, with increases in business and leisure travel, people may leave homes or businesses unoccupied or unattended for longer periods of time, which can be inviting to thieves. Various tools are available to help mitigate potential losses, such as security systems with window and door sensors, motion sensors, surveillance systems, access control systems, smart home systems, and the like. Some security systems include or use video surveillance, such as using video cameras that can be deployed indoors or outdoors. Such video or image-based systems can reside locally, with cameras and recording media stored locally. In an example, other systems can be distributed with image capture or camera devices locally deployed and storage or processing located remotely. In an example, image or video information from a security system is stored in the cloud.

In some security systems equipped with one or more cameras or microphones, users can access image or audio information on-demand, or a system can be configured to record or store image or audio information continuously or selectively. For example, a security system can be configured to record image or video or audio information when a camera detects movement in a monitored area. Depending on factors such as a camera location and environment, a motion-based event generation system can generate hundreds of events per day. As a number of events grows, it can be difficult for a user to process the resulting volume of event information made available by the system.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
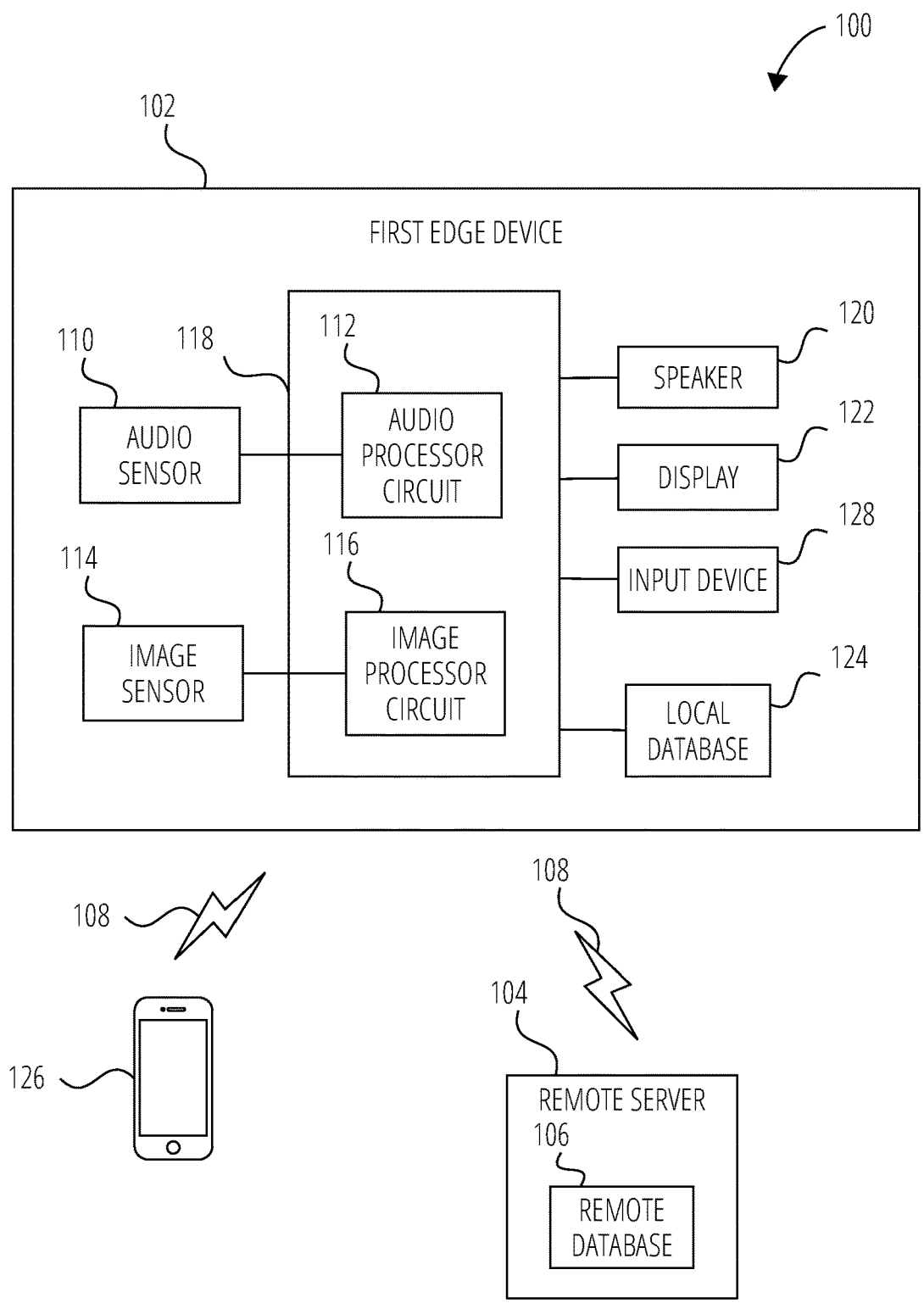
FIG. 1 illustrates generally an example of a first system that includes an edge device, a remote server, and a user device.

Example methods and systems discussed herein are directed to user validation or user authentication for security devices, systems, or access control systems. The various examples discussed herein merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Traditional security systems monitor an environment and alert a single entity, such as a property owner or service provider, in response to a security breach. The present inventors have recognized, among other things, that a problem to be solved includes preventing a security breach using a security system that can use image information or acoustic information to identify individuals with different access permissions. The present inventors have further recognized that authentication of a user (e.g., of a person or entity that requests access), such as to grant or deny user access to a protected environment, can be performed using multiple factors or multiple different inputs or information about the user. The multiple factors can include different media, such as can include image information or acoustic information or biometric information, that is about or from a user. In an example, at least one of the factors can include information about a gesture performed by the user. The present inventors have recognized that using information about a gesture can help prevent spoofing in image recognition systems, or in security systems that can use image-based authentication.

In an example, a solution to these and other problems can include systems and methods for authentication and validation that can receive candidate face information, including gesture information, from a first individual, and receiving other information from or about a second individual in proximity of the first individual. The solution can include providing the candidate face information to a first artificial intelligence-enabled analyzer, such as a machine learning system, a deep learning system, or a neural network-based recognition processor, among others, and in response, receiving a first recognition result indicating whether the first individual corresponds to a first enrollee of the security system. The solution can include providing the other information from or about the second individual to a second artificial intelligence-enabled analyzer and, in response, receiving a second recognition result indicating an access risk metric. An access control system can then conditionally grant or deny access to a protected area based on the first and second recognition results.

In an example, the solution can include a security system, or processor coupled to a security system, and can use processor-implemented artificial intelligence to analyze or respond to information from an audio sensor, from an image sensor, or from a combination of audio, video, and/or other monitoring sensors such as thermostat or other environment condition sensors, door sensors, window sensors, lock sensors, etc. The processor-implemented artificial intelligence, as used herein, generally includes one or both of machine learning and deep learning. In some instances, one or the other of machine learning and deep learning can be used or implemented to achieve a particular result. Accordingly references herein to one or the other of machine learning and deep learning can be understood to encompass one or both forms of artificial intelligence processing.

Classical or traditional machine learning (sometimes referred to herein as "ML" or "classical ML") can include or use algorithms such as Bayes Decision, Regression, Decision Trees/Forests, Support Vector Machines, or Neural Networks, among others. Deep learning (sometimes referred to herein as "DL") can be based on deep neural networks and can use multiple layers, such as convolution layers. Such DL, such as using layered networks, can be efficient in their implementation and can provide enhanced accuracy relative to classical ML techniques. In practice, DL algorithms can be more computationally demanding than classical ML algorithms. In an example, classical machine learning (ML) can be distinguished from deep learning (DL). Generally, DL models can outperform classical ML models. However, DL models can consume a relatively larger amount of processing or power resources, and such resources can be scarce on embedded platforms such as platforms without dedicated graphics processing cores.

In an example, an audio classification technique can include or use a two-stage approach. In a first stage, a classical ML model can be used, such as a Support Vector Machines (SVM) model or technique. Other models such as Logistic Regression, Decision Trees, Neural networks, or others can be used. In a second stage, a DL model can be based on a Convolutional Neural Network (CNN), for example, using a 48×96 spectrogram. The DL model can be optimized to balance the competing requirements of accuracy and edge processing on embedded devices that can be power limited. In an example, devices that include an embedded co-processor such as a DSP or GPU can execute classification techniques using more complicated models. In an example, the audio classification technique can include using a loudness detector to optimize computation time and processing resource usage. For example, the loudness detector can be used to identify sounds that have greater than a specified threshold loudness characteristic such that only sufficiently loud sounds are further processed. When a sufficiently loud sound is detected, then subsequent steps of feature extraction and machine learning and/or deep learning-based classifications can be performed.

Various algorithms can be employed by computers (devices, machines, systems, etc.) to automatically and accurately detect human bodies in images and/or video received from a camera, or to detect the presence of a human using audio information. In an example, deformable part-based models of Histogram of Oriented Gradients (HOG) features, such as combined with latent Support Vector Machines (SVM) techniques, can be used to detect one or more individuals or human bodies in an image. Part-based human detection can be used to localize various body parts of an individual in an image. In an example, part-based detection uses root filters and part filters.

In an example, human detection using machines to analyze image or audio information includes model training and detection. Training can be an offline step where a machine learning algorithm (such as a CNN) is trained on various training data to learn human and non-human forms or features from various image information or acoustic information or biometrics or physiologic information. In an example, image-based detection can use one or more machine learning models to classify human and non-human regions in an image or frame. Acoustic-based detection can use one or more machine learning models to classify human speech or other acoustic information (e.g., breathing noises, audible footsteps or related movement cadence information) in an audio sample. In an example, the detection is performed using a pre-processing step of identifying potential regions in an image or portions of an audio sample for presence of a human and a post-processing step of validating the identified potential image regions or audio sample portions. In the detection step, part-based detectors can be used in the identified image region(s) by a root filter such as to localize, or provide information about a location of, each human body part. In the detection step, time-domain or frequency-domain analyzers can be used to process the audio sample portions to identify a presence of a human or of a particular human from among a group of known humans.

In an example, filters and deformable part-based models or algorithms can be used together to model a human appearance more accurately and in a more robust manner. Various examples of the filters can include HoG or HoG-like filters. Models can be trained by a latent SVM formulation where latent variables usually specify an object of interest (e.g., a human, or a portion of a human such as a face or head), such as including relative geometric positions of parts of a human.

In an example, a root filter can be trained for an entire human body and part filters can be separately trained within regions of different root filters using latent SVM techniques. In an example, a model includes root filters that cover the target object and part models that cover smaller parts of the target object. The part models in turn include their respective filters, relative locations and a deformation cost function. To detect a human face in an image, an overall score can be computed for each root location, and higher relative score locations can be considered as candidate locations for the human face or facial features. Other techniques can similarly be used.

FIG. 1 illustrates generally an example of a first system 100 that includes a first edge device 102, a remote server 104, and a user device 126. In an example, the first system 100 can be part of at least one of a surveillance system, a security system, a traffic monitoring system, a home security system, a toll fee system, or the like. At least one of the first edge device 102 and the remote server 104 can include a processor circuit configured to perform multiple-factor recognition or authentication of individuals or objects. The first edge device 102 can include, for example, a security system panel for an installed security system. The first edge device 102 can include a processor circuit 118 such as can include one or more processing cores, and each core can have a respective different function. In an example, the processor circuit 118 is a notional circuit that includes multiple different discrete processor circuits or cores that are coupled by an interface.

In the example of FIG. 1, the processor circuit 118 includes an audio processor circuit 112 and an image processor circuit 116. The first system 100 includes an audio sensor 110 such as a microphone that can receive audio signals and provide audio signal information to the audio processor circuit 112. The first system 100 includes an image sensor 114 such as a video camera that can receive image signals and provide image information to the image processor circuit 116. Although the present discussion includes or refers to the first edge device 102, it can be understood that an audio-only device or image-only or biosignal-only monitoring or security device can be provided with the same or similar hardware and/or software and can exclude one or the other of the audio sensor 110 or the image sensor 114.

In an example, the audio processor circuit 112 can be a dedicated hardware unit configured to process audio, while in other examples, the audio processor circuit 112 can be a software-implemented module that is executed on the same or different processor circuit as other functions. In an example, the audio sensor 110 includes one or more microphones, such as an array of microphones, configured to receive one or more audio input signals such as from a user or from various non-user-based occurrences in an environment. In an example, one or more signals from the audio sensor 110 can be processed for noise reduction, feedback elimination, beam forming, or automatic gain control.

In an example, the image sensor 114 includes a sensor with a particular field of view (FOV). In an example, the image sensor 114 includes two 180 degree view sensors, such as can be joined back-to-back to provide a 360 degree view of an environment. In another example, the image sensor 114 includes a camera providing a 180 degree view in a horizontal direction. Such a single camera can be configured to rotate or look in a circular manner around the environment, and an image generated by such camera can be warped and de-warped for analysis or display purposes.

The first system 100 can be configured to perform audio-based and/or image-based and/or biometric-based recognition functions. For example, the processor circuit 118 can use information from the image sensor 114 to perform facial recognition or gesture recognition, such as to identify a presence or absence of authorized or unauthorized individuals or objects, or can use information from the audio sensor 110 to perform audio or acoustic recognition, such as to identify the presence or absence of various individuals, events, or objects. The processor circuit 118 can be communicatively coupled to the remote server 104 using a network 108. The network 108 can be any suitable wired network, wireless network, or a combination of wired, wireless, or other network. In an example, the network 108 includes a LAN or wireless LAN connection, an internet connection, a point-to-point connection, or other network connection and combinations thereof. The network 108 can be any other type of network that is configured to transmit or receive data from host computers, personal devices, telephones, or any other electronic devices. The network 108 can be a combination of an enterprise network (or the Internet) and a cellular network, in which case, suitable systems and methods are employed to seamlessly communicate between the networks, and a mobile switching gateway can be used to communicate with a computer network gateway to pass data between the networks. The network 108 can include or use any software, hardware, or computer applications that can provide a medium to exchange signals or data in various formats. In an example, some or all of the recognition functions performed by the first system 100 can be performed at or using systems, devices, or processors that are remote from the first edge device 102, such as at the remote server 104.

The first edge device 102 can include a display 122 for displaying information generated by the processor circuit 118, and a speaker 120 for providing audible information generated by the processor circuit 118, such as including audible responses to user inquiries. In an example, the display 122 or the speaker 120 can be part of a computing device, such as a personal computer, a laptop, a smart phone, and the like, such as can be in data communication with the processor circuit 118 or other aspect of the first edge device 102. The first edge device 102 can include an input device 128 for receiving information (e.g., other than image or audio information) from a user or individual. In an example, the input device 128 can include a keypad or other alphanumeric input device, or a fingerprint reader, or a biometric or biosignal input device, such as can be used to receive a password, passcode, or other means of authentication.

In an example, the audio sensor 110, the audio processor circuit 112, and optionally the speaker 120, can be integrated in a single device, sometimes referred to as an audio assistant, an intelligent audio assistant device, a voice-controlled virtual assistant, or a user-controlled virtual assistant. In an example, the image sensor 114, the image processor circuit 116, and optionally the display 122, can be integrated together in a single device, sometimes referred to as a video assistant or an intelligent video assistant device. In an example, the intelligent video assistant device can be communicatively coupled to an intelligent audio assistant device using an interface that couples the processor circuits. In the example illustrated in FIG. 1, the processor circuit 118, the audio sensor 110, the image sensor 114, the display 122, and the speaker 120 can be integrated together to form a device referred to herein as the first edge device 102. The first edge device 102 can optionally include a local database 124 such as can include a long-term or short-term memory circuit.

Artificial intelligence-based analysis of information from the audio sensor 110 or the image sensor 114 can be performed locally in the first edge device 102 using the processor circuit 118 or can be performed elsewhere, such as using the remote server 104. In an example, the audio processor circuit 112 and/or the remote server 104 can include or access the local database 124 or the remote database 106, such as can be configured to store, among other things, various media, object template data, audio signature data, image data, and other information. In an office environment, the databases can store information about one or more employees, including names, roles, permitted or expected in/out times, designations, accessible systems, contact lists, calendars, etc. In an example, valid and recognizable users of a system can be predefined or enrolled or identified by the first edge device 102 and saved in one or both of the databases. In an example, the local database 124 or the remote database 106 can be in communication with office enterprise servers to access office data of one or more users.

In an example, the audio processor circuit 112 can process audio information from one or more users, either locally or using the remote server 104. Thereafter, the processor circuit 118 and/or the remote server 104 can use the audio information to decipher user requests and actions, and automatically service one or more user requests.

In an example, the first edge device 102 can perform an identification, authentication or recognition algorithm on image or audio or biometric signals. The algorithm can include voice recognition to identify a person from a characteristic of his or her voice. Voice recognition can be used to determine who is speaking and/or to determine what is being said. Identification of a person who is speaking can be referred to as "speaker recognition" and identification of what is being said can be referred to as "speech recognition." In an example, recognizing a speaking individual can simplify the task of translating speech in systems that have been trained on a specific individual's voice, or it can be used to authenticate or verify a speaker's identity. Speaker verification seeks to determine a 1:1 match where one speaker's voice is matched to one template whereas speaker identification seeks to determine a match from among N different acoustic signatures or acoustic templates.

In an example, a recognition system can include two phases: enrollment and verification. During enrollment, for example, a media object such as an image, video, or audio sample, can be received and recorded. Image characteristics or voice features (e.g., frequency components or spectral information) can be extracted to form a reference, such as a reference image, voice print, template, or model. In the verification phase for audio or image information, a candidate media (e.g., image and/or audio) sample can be compared against a reference. For identification systems, the candidate media can be compared against multiple reference media to determine a best match. For authentication systems, the candidate media can be compared against a particular reference, such as for a particular person or authorized (or unauthorized) user.

In an example, the audio processor circuit 112 can authenticate a user and can check for permission to put the device in one or more different modes, such as including a monitoring mode. In the monitoring mode, the first system 100 can use information from the audio sensor 110 or the image sensor 114 to detect objects in the environment, capture motion information about the detected objects, track and classify objects in the environment, and detect and recognize sounds. In response, the processor circuit 118 can use a rules-based framework to determine whether to sound an alarm or alert a particular system operator or user. In an example, the rules-based framework includes using a combination of data from one or more auxiliary sensors that are configured to transmit information to the first system 100.

In an example, the image sensor 114 can be configured to have embedded triggers for motion detection, human detection, or human or other object recognition. That is, a module or function of the image sensor 114 can be or can include image analysis to determine if motion exists in the environment (e.g., by comparing changes in pixel information from a series of frames acquired by the image sensor 114), or can include image analysis to determine if a human form, or a particular human or other object, is present in the field of view of the image sensor 114. In response to motion or a positive identification or a human or other object, the image sensor 114 or the image processor circuit 116 can generate an event indication that can, among other things, cause video information corresponding to the event to be recorded or displayed to a user, such as a system administrator, such as for authentication or validation.

In an example, the image processor circuit 116 is configured to analyze images received by the image sensor 114 to determine whether a received image includes a recognized face (e.g., a face of an enrolled individual). If a face is detected or recognized, then the image processor circuit 116 can generate an event indication and report the event to a user, such as together with video or image information about the event. In an example, the image processor circuit 116 can be configured to trigger an event for storage and/or streaming, such as without performing face recognition. When a face is detected or recognized, the event information can be updated in a server to reflect this as part of the event, such as using metadata associated with the video or other data associated with the event. After the face is detected or recognized, the server can make available, or can communicate to a user, information about the event and/or about the detected face. In an example, the server can provide an alert to a system administrator such as using a push notification, email, SMS (Short messaging service), etc., such as whenever particular events are created or whether pre-defined rules are triggered.

In an example, the image processor circuit 116 includes a face recognition module, such as a software-implemented ML or DL module that is executed at one or more of the first edge device 102 or the remote server 104 or elsewhere, such as a remote user device (such as can be coupled to the network 108). In an example, a mobile or web application executed on the user device can be configured to capture a video or image and send the corresponding data to a face recognition engine for enrollment. As part of this enrollment process, the user can create an entity in the first system 100 by providing attributes of the person in the captured video or image, such as the person's name, relationship, group, or other information uniquely identifying the person. The user can manage and maintain the person details and trained images through the face recognition engine. Any image or video that is passed into the face recognition engine, such as from the image sensor 114, can be processed to determine whether a face is detected and whether it matches an enrolled person. If an enrolled face is detected, then the face recognition engine can return the attributes associated with that person, such as together with a time stamp, person name, confidence level or relatedness metric, bounding box location of the face, or a frame number. If a face is detected but not determined to be part of an enrolled list of users, then the face recognition engine can return an unknown face detected event, such as together with a time stamp, bounding box, location of the face, or the frame number of the face found in the video. Any or all of these attributes can be passed to a local or remote server for storage, retrieval, or further processing.

In an example, the first system 100 can include or use other sensors such as can be communicatively coupled with one or more components of the first system 100. Such a sensor can be configured to sense information about the environment in which it is deployed to detect deviations from a normal condition or to detect changes that exceed some specified threshold condition. In an example, a ML or DL system can be used to monitor sensor data to establish normal conditions over time. The sensors can include, for example, biologic or biometric sensors, a passive infrared (PIR) motion sensor, a thermostat, a fire or smoke alarm sensor, an access control device or card reader, a door or entryway sensor, a garage or gate sensor, an acoustic sensor, a smart speaker, or others. In an example, such sensors may not include an integrated or embedded audio sensor or image sensor. However, the present systems can be used to augment such edge devices. For example, a camera (e.g., the image sensor 114) and an image processor (e.g., the image processor circuit 116) can be added or communicatively coupled to an edge device sensor. The image sensor 114 can capture images or videos at or near the edge sensor. In an example, camera activity or image sensing or recording can be triggered or initiated in response to information detected in an image or by an alert or other indication from another sensor.

In an example, a PIR motion sensor can sense motion or activity. Upon positive identification of the motion or activity, the PIR sensor can send a signal to the audio sensor 110 or the image sensor 114 or other portion of the first edge device 102 to begin receiving or recording audio or images. The received information can be processed, such as inside the first edge device 102, to determine whether a particular enrolled person is present in or absent from the scene.

In an example, events, actions, environmental changes, or other information sensed from non-visual sensors can be received and processed. In an example, the sensor information can be aggregated at a monitoring device or security panel such as installed on premise or located remotely in the cloud, such as to trigger video recording or face capture. Some examples of non-visual triggers, events, actions, or environmental changes can include but are not limited to doorbell button pushes, door or gate open triggers, other external relay or contact triggers, smoke or fire alarm triggers, acoustic information or events, temperature triggers, and others. In an example, a notification generated for a system administrator can include information from or about the non-visual sensors, such as can be provided together with visual image or video information from a camera.

In an example, the first system 100 can be configured to receive a trigger event, such as indicated by a visual or non-visual sensor, and perform some responsive action. In an example, the responsive action can be selected to augment or enhance a face or voice recognition process. For example, in response to a trigger event, the first system 100 can cause lights to turn on in a designated monitored area. In an example, the lights can enhance image capture by the image sensor 114 and thus facilitate facial recognition processing or reporting to the user. In an example, the responsive action can include receiving other or additional information about persons or objects in the vicinity of a protected environment and such other or additional information can be analyzed to provide multiple-factor recognition or authentication.

In an example, audio communication can be established between a monitored environment and another location, such as when a particular person is detected in the environment using the facial recognition functions of the first system 100. In an example, the other location can include a monitoring station. The audio communication can be used to communicate information to the particular person such as to provide a verbal warning, or to request a voice audio sample that can be used for authentication, or to establish a call between the particular person and an emergency responder (e.g., 911 operator) or call center personnel.

In an example, in response to a trigger event, audio communication can be established between the monitored environment and the user. In an example, the audio communication can be established when a face is detected but not recognized, such as can signify that a real person is detected in the monitored environment. In an example, the face detection can be based on a liveliness check to ensure that there is a real person in the scene. Information from the audio communication can be used to help determine whether the present individual is authorized or not.

In an example, an edge device-based facial recognition system can be configured to provide various information. For example, a result of a facial recognition algorithm can be that (i) one or more recognized or enrolled individuals or objects are detected to be present in a scene, or (ii) one or more unrecognized or unenrolled individuals or objects are detected to be present in the scene, or (iii) some individuals or objects in the scene are recognized or enrolled and some are not, or (iv) some individuals or objects are determined to be present in the scene but the first system 100 has a relatively low confidence that at least one of the individuals corresponds to a recognized or enrolled individual. Information about the recognized or enrolled individuals, such as names or other characteristics can be determined and stored, communicated to a user, or otherwise used.

In an example, a face recognition engine is configured to process one or more received images (or frames of video data) and execute various algorithms for detecting a presence of a human face, identifying features of the human face, and then providing an indication of whether the features correspond to an enrolled or known individual. In an example, the face recognition engine first processes each of one or multiple received images to identify one or more regions that are likely to include a human face or that include candidate faces or candidate facial features. Next, the face recognition engine can identify facial feature relationships and calculate an overall score, or value indicating a relatedness of reference information to candidate information, based on one or more scores associated with the features. The overall score can be a metric that indicates a confidence that a particular known or enrolled human or individual is identified in the scene, as opposed to another human or a non-human object. While performing facial recognition or audio signature recognition, the processor circuit can be configured to consider occlusion (e.g., by a face mask such as a surgical mask or dust mask or other particulate-filtering mask), illumination or other conditions.

In an example, an object recognition engine is configured to process one or more received images (or frames of video data) and execute various algorithms for detecting a presence of one or more objects, identifying features of the object, and providing an indication of whether the object or features correspond to a known class of objects. In an example, the object recognition engine first processes each of one or multiple received images to identify one or more regions that are likely to include an identifiable object. Next, the object recognition engine can identify features or characteristics of the object(s) and calculate an overall score, or value indicating a relatedness of reference information to candidate information, based on one or more scores. The overall score can be a metric that indicates a confidence that a particular known or enrolled object identified in the scene belongs to a particular class of objects, or whether the object can be positively identified as a particular object.

In an example, the user device 126 such as can be associated with a system administrator or other security system user, can include a mobile or desktop application or web interface. A user can use the user device 126 to receive reports about one or more other components of the first system 100, such as including configuration information, enrollment information, or archived event information, or live image or video feed information. In an example, the interface can include or display a timeline of events including an indication of when one or more enrolled individuals or objects were visible, such as on a specified date or date range.

In an example, the user device 126 can be used to establish two-way or one-way communication between the user and the environment that includes the first edge device 102. For example, a user can use the user device 126 to begin a conversation with an unknown person in the field of view of the image sensor 114, for example using cloud connectivity to initiate the communication between the mobile application of the user device 126 on one end and the image sensor 114 at the other end. In this example, video and/or audio information from the can be provided at the user device 126 substantially in real-time and audio and/or video information from the user device 126 can be played back using, for example, the speaker 120 or the display 122.

The example of the processor circuit 118 can comprise all or a portion of one or more of the other processor circuits discussed herein, such as the audio processor circuit 112, the image processor circuit 116, or one or more other processors or circuits, such as can be provided outside of the first edge device 102. In an example, the processor circuit 118 can include one or more processor(s) or processor cores. The one or more processor(s) can be implemented as one or more microprocessor circuits, microcomputers, microcontrollers, digital signal processor circuits, central processor circuits, logic circuitries, and/or any devices that manipulate data based on operational instructions. Among other capabilities, the one or more processor(s) are configured to fetch and execute computer-readable instructions stored in a memory, such as the local database 124, the remote database 106, or elsewhere. The memory can store one or more computer-readable instructions or routines, which can be fetched and executed to create or share the data units over a network service. The memory can comprise any non-transitory storage device including, for example, volatile memory such as RAM, or nonvolatile memory such as EPROM, flash memory, and the like.

The processor circuit 118 can comprise an interface(s). The interface(s) can comprise a variety of interfaces, for example, interfaces for data input and output devices, referred to as I/O devices, storage devices, and the like. The interface(s) can facilitate communication of the processor circuit 118 with various input devices and an output devices. The interface(s) can also provide a communication pathway for one or more components of the processor circuit 118. Examples of such components include, but are not limited to, various other processing circuits or engine(s) and data. The processing engine(s) can be implemented as a combination of hardware and programming (for example, programmable instructions) to implement one or more functionalities of the processing engine(s). In examples described herein, such combinations of hardware and programming can be implemented in different ways. For example, the programming for the processing engine(s) can be processor executable instructions stored on a non-transitory machine-readable storage medium and the hardware for the processing engine(s) can comprise a processing resource (for example, one or more processor circuits), to execute such instructions. In some examples, the machine-readable storage medium can store instructions that, when executed by the processing resource, implement the processing engine(s). In such examples, the processor circuit 118 can comprise the machine-readable storage medium storing the instructions and the processing resource to execute the instructions, or the machine-readable storage medium can be separate but accessible to processor circuit 118 and the processing resource. In other examples, the processing engine(s) can be implemented by other electronic circuitry.

The data can comprise data that is stored or generated as a result of functions implemented by any of the components of the processing engine(s). In an example, the processing engine(s) can comprise an input receive engine, an audio processing engine (e.g., comprising the audio processor circuit 112), a video processing engine (e.g., comprising the image processor circuit 116), an event identifier engine, a notification engine, and other engines.

In an example, the input receive engine receives input data from an input device, such as from the audio sensor 110 or the image sensor 114. The input data can include, among other things, a sequence of images of a video stream and audio signals, such as audio signals that can be associated with video input data, such as for purposes of monitoring and surveillance. In an example, the audio processing engine and the video processing engine can process the audio signals and the video stream respectively. In an example, the video processing engine can extract feature data from the input data to detect one or more objects in the respective images of the video stream.

In an example, the audio processing engine can process audio commands received or detected by the audio sensor 110. In an example, the audio commands are selected to cause the first system 100 to operate in an assistant mode or a monitoring mode or an authentication mode. In an assistant mode, the first system 100 can be configured to perform tasks or services for a user such as by using natural language processing (NLP) to match a user voice input to executable commands and can provide an audible response to the user through an output device such as the speaker 120, or provide some other system response. The audio processing engine can continually learn using artificial intelligence techniques including machine learning and deep learning.

In an example, an event identifier engine of the processor circuit 118 can be used to determine an event by comparing attributes of one or more visually detected objects or acoustically detected audio events with pre-defined rules, such that when an event is determined, and a notification can be sent to the user using a notification communication engine (e.g., using the user device 126). For example, a rule can be defined for a particular object that if the particular object is not detected in an image, then the particular object can be termed as a "missing object" and a notification can be sent to a user using the notification engine. In an example, the audio processor circuit 112, the image processor circuit 116, and the event identifier engine can be used together to determine, e.g., present or missing individuals or objects, intrusion or attempted intrusion by an unidentified person, successful or unsuccessful multiple-factor authentication events, or other events that can trigger a notification to a user.

In an example, the notification engine can be configured to notify various users based on a set of rules defined for each respective user. For example, if the first system 100 is used by several users, separate rules can be defined for each user so that the notifications can be sent to designated ones of the users only.

In an example, the first system 100 can notify a user about detected unusual or abnormal visual events. For example, the first system 100 can detect an intrusion into a designated zone or can determine if an individual or vehicle or other object is loitering or remaining in a particular zone for greater than a specified threshold time duration. In an example, the first system 100 is configured to determine names or other information about detected individuals, if the first system 100 is pre-configured with such information, and/or to label individuals or objects as unknown. In an example, the first system 100 can detect and notify a user about regular events, for example, to alert a user when a package or box or e-commerce delivery or mail is detected in a particular location in a field of view.

Figure 2:
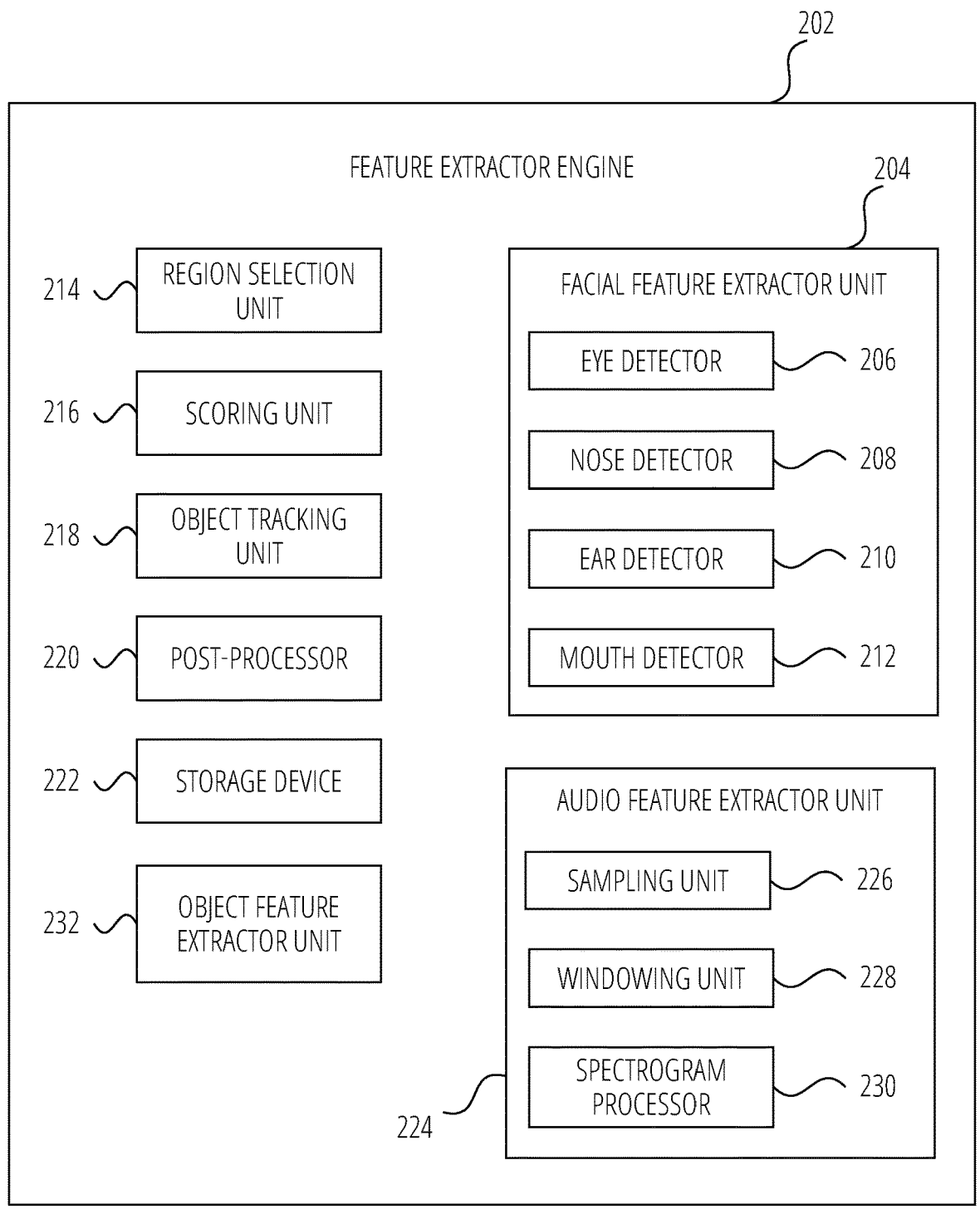
FIG. 2 illustrates generally an example of a feature extractor for an artificial intelligence-enabled analyzer.

FIG. 2 illustrates generally an example of a feature extractor engine 202. The feature extractor engine 202 can be implemented in whole or in part in one or more of the first edge device 102, the remote server 104, the user device 126, or elsewhere. That is, various functional aspects of the feature extractor engine 202 can be performed at or in one of the devices, or can be distributed across multiple devices. In an example, the feature extractor engine 202 can comprise a portion of an artificial intelligence processing system, such as can include one or more ML or DL algorithms, classifiers or neural networks. The feature extractor engine 202 can process media information, such as image or audio information from or about various objects, and identify various media features or characteristics that can be analyzed.

In the example of FIG. 2, the feature extractor engine 202 includes a region selection unit 214, a facial feature extractor unit 204, an audio feature extractor unit 224, a scoring unit 216, an object tracking unit 218, a post-processor 220, a storage device 222, and an object feature extractor unit 232. The facial feature extractor unit 204 can further include one or more specialized extractor modules or functional units to process image information. For example, the facial feature extractor unit 204 can include an eye detector 206, a nose detector 208, an ear detector 210, a mouth detector 212, or other module configured to detect various features or aspects of a human face that can be used in a recognition algorithm.

The audio feature extractor unit 224 can further include one or more specialized audio feature extractor modules or functional units to process audio information. For example, the audio feature extractor unit 224 can include a sampling unit 226 such as can be configured to receive an audio sample and parse it into overlapping or non-overlapping audio frames. The audio feature extractor unit 224 can include a windowing unit 228 that is configured to apply a windowing function on the audio frames. In an example, the windowing function includes a Hamming windowing function or a Hann windowing function. The windowing function can be performed using the audio processor circuit 112 or another processor circuit.

In an example, a windowing function can be configured to pass frequency and amplitude information from the audio frames that is most likely to include an abnormal event of interest. For example, if the first system 100 is configured to perform authentication using a voice signature, then the windowing function can be configured to pass primarily middle frequency audio information corresponding to speech. However, in an example, using ML-based processing can be configured to automatically learn about frequency or other content of interest and accordingly an ML-based technique can reduce or eliminate a need for frequency-based windowing. In an example, the audio feature extractor unit 224 can be configured to determine a power spectrum of one or more of the audio frames. The power spectrum can be determined using a fast Fourier transform (FFT) or other signal transform technique that can provide information about a distribution, such as a relative or absolute distribution, of sound energy at or centered at different frequencies. The audio feature extractor unit 224 can further include a spectrogram processor 230 that can operate on the determined power spectrum. The spectrogram processor 230 can be configured to generate an audio signal spectrogram such as can include a representation of a spectrum or number of different frequencies or frequency bins that include information from the audio frames. The spectrogram information can be used as an input to one or more ML or DL classifiers.

In an example, the feature extractor engine 202 includes an input unit to receive a media, such as frame-based image data or audio information. In an example, the input unit receives image information from one or more systems including the image sensor 114, the audio sensor 110, or elsewhere. The input unit can receive a video stream instead of an image and the video stream can be divided into a sequence of frames. In an example, the feature extractor engine 202 is configured to remove noise from a received media frame or enhance edges before further processing. The frames can be received by the feature extractor engine 202 automatically at pre-defined intervals or irregularly. For example, the feature extractor engine 202 can receive frames on demand, such as when an identification trigger is sent by, for example, a motion detector. In an example, frames can be received in response to a user or system request.

In an example, images are captured in real-time by the image sensor 114, and the images can be stored. The images received can be in any suitable format for data analysis. The images can include objects such as human bodies, objects carried by or coupled to a body, weapons, vehicles, trees, animals, buildings, any articles and so forth. Further, the images can include one or more regions that include non-human objects. Generally, regions that include or that may include a human face or facial feature or an object can be referred to herein as a candidate region of an image. A frame or image can have zero, one, or multiple candidate regions. In an example, a candidate region comprises all or a portion of a frame. That is, the candidate region can correspond to an entire field of view or less than an entire field of view.

In an example, the region selection unit 214 is configured to select one or more candidate regions from the one or more of regions in a frame based on a pre-defined threshold. The pre-defined threshold can indicate a probability of finding an object such as a human face, or a portion or part of an object or human face, in a region of the frame. In an example, candidate regions can include bounding boxes that are generated using machine learning-based detector algorithms. These algorithms can run efficiently, quickly, and generate candidate regions with false positives that can generally be eliminated through further or more intensive processing.

In an example, the region selection unit 214 executes a region selection algorithm to select one or more candidate regions. The region selection algorithm can be biased to provide a low number of false negatives, meaning if a region includes an object or human face or feature, then there is very low probability that the region will be rejected. In an example, the region selection algorithm can be biased to provide a high number of false positives, meaning if a region does not have a human face or feature, then the region can be selected. Various algorithms can be used for candidate region selection such as motion-based algorithms, simple HOG and SVM-based algorithms, and foreground pixels detection-based algorithms. After the one or more candidate regions are selected, then the selected regions can be provided to the object feature extractor unit 232 or the facial feature extractor unit 204 for further processing.

In an example, the facial feature extractor unit 204 is configured to detect a human face in a candidate region of the one or more candidate regions based on various constraints, such as can include one or more sets of pair-wise constraints. The facial feature extractor unit 204 can perform parts-based detection of the human face such as to identify facial features such as eyes, nose, ears, mouth, hair, or other attributes of a face or head region. In an example, the facial feature extractor unit 204 includes a set of feature detectors for detecting respective parts of a head or face. For example, the facial feature extractor unit 204 includes the eye detector 206, the nose detector 208, the ear detector 210, or the mouth detector 212. The eye detector 206 can be configured to detect locations or features of one or more eyes (e.g., size, placement, color, pupillary distance, etc.), the nose detector 208 is configured to detect size, placement, or other features of a nose, and so on. In an example, the facial feature extractor unit 204 can detect head-worn objects such as face masks, and can optionally detect or extract features from such objects.

In an example, the feature extractor engine 202, the object feature extractor unit 232, and/or the facial feature extractor unit 204 includes or uses Convolutional Neural Networks (CNNs) to process media data (e.g., comprising image information and/or audio information) and provide an indication or classification of the information in the media as, for example, comprising an object of a known class, or comprising a face or being a face of a particular known or enrolled individual, or comprising an audio signature or voice of a particular known or enrolled individual. In an example, a neural network used herein for object or face detection or analysis can use ResNet or DenseNet architectures, or others. The network can be configured to incorporate or use motion information, such as by analyzing information from multiple image frames over time, to provide a result with information about a presence or absence of an object or human face in a frame. In an example, the network can be configured to use angle or depth information about a candidate object in its determination or classification algorithms, such as to analyze a gesture or other change in appearance over time of an individual or object to be authenticated.

The neural networks discussed herein and the models employed in such networks can be trained using various data sources. For example, specific training data that corresponds to an end application or end user can be used to train the model employed by the network. The models can be specific to different use cases or environments or can be more general. In an example, a semi-supervised (semi-manual) process can be used to import learning data. In an example, training data can include gesture information about movements that are or can be performed by enrolled individuals. Gestures can include, among other things, head movements such as nods or turns, hand movements, shoulder movements, eye movements (e.g., blinking or moving the eyes to look in different directions), mouth movements (e.g., to show teeth, or pucker lips, or to silently mouth words), foot movements, leg movements, hip movements, or other body movements that can be observed and about which the facial feature extractor unit 204 can extract information.

The neural networks discussed herein can be tuned to maximize power efficiency, such as using fixed-point calculations using weighted or output-quantized nodes. Generally, a network library footprint can be about 1 MB or less of data, however larger library files can be used when more resources (power, processing time) are available. Memory buffers used to perform the neural network-based analysis can be used and reused, that is, the buffers can be swapped throughout execution and are allocated only on demand. In an example, auxiliary hardware or accelerators can be used, such as to perform specific tasks like CV functions, matrix multiplication, CNN execution, and more.

In an example, the facial feature extractor unit 204 detects a first facial feature at a first location in a candidate region using a first facial feature detector of the set of facial feature detectors. The first facial feature can be considered a root of a face, for example, eyes of a face. The facial feature extractor unit 204 further detects a second facial feature at a second location in the candidate region using a second feature detector of the set of facial feature detectors. The second body part detector is selected from the set of facial detectors, and can be based on a pair-wise constraint. The pair-wise constraint can be determined based on a relative location of the second location with respect to the first location.

In an example, the facial feature extractor unit 204 implements or uses fewer than all of the multiple available detectors, however, a decision of whether to apply one or more of the various available detectors can be condition-based. For example, the eye detector 206 can be applied first and if eyes are detected, such as eyes meeting a particular threshold condition, then other ones of the feature detectors can be applied in appropriate regions, or portions of a frame, relative to the detected eyes. The condition-based implementation helps reduce a number of times the detectors are applied and can reduce processing time and power consumption. Further, a conditionally-applied body parts-based network of classifiers helps reduce a size of the network and provides better performance as compared to a full face or head-based classification network. Following identification of one or more facial features, information about the detected one or more body parts can be provided to the scoring unit 216 for further processing.

In an example, the scoring unit 216 can be configured to compute a score for a candidate region based on at least one of a first score and a second score. The first score corresponds to a score of the first facial feature and the second score corresponds to a score of the second facial feature. The first score can be determined based on the detection of the first facial feature at the first location and the second score can be determined based on the detection of the second facial feature at the second location. Based on the first score and the second score, an overall score can be computed for the detected face by the scoring unit 216. In an example, the overall score can be a summation of the first score and the second score. In another example, the overall score can be a weighted summation of the first score and the second score. In an example, the facial feature extractor unit 204 can further implement one or more other facial feature or body part detectors, such as a torso detector or shoulder detector, until a complete or entire human upper body is detected. Based on the detected body parts, an overall score can be computed.

In an example, the object tracking unit 218 can be configured to track an object, head, face, body, or candidate region, across multiple frames. The tracking can be performed using techniques such as a MeanShift technique, an Optical Flow technique, a bounding box estimation technique, or other technique. In an example, a detected face can be tracked using the information contained in the current frame and one or more other adjacent (e.g., preceding or subsequent) frames. An object association or correspondence can be determined or provided for the detected objects in the different frames. In an example, a bounding box estimation process is executed, and the bounding box (or other shape containing the object) of an object in a current frame is compared with a bounding box in a previous frame(s) and a correspondence between the objects and/or bounding boxes to establish a cost function. The bounding box techniques can represent region and location information for an entire body or less than an entire body.

In an example, feature or model-based tracking can be used. According to this example, a pair of objects or features that includes a minimum value in a cost function can be selected by the object tracking unit 218. A bounding box of each tracked object can be predicted based on maximizing a metric in a local region. The prediction can be made using techniques such as, but not limited to, optical flow, mean shift, and/or dense-sampling search, and can be based on features such as HOG color, Haar features, and the like.

In an example, when object or feature tracking processing is complete, the object tracking unit 218 communicates with the post-processor 220 for further steps. The post-processor 220 can be configured to validate a detected face in the candidate region. The face can be validated based on at least one of a depth, a height and an aspect ratio of the face. In another example, the validation can be performed based on generic features such as color, HoG, SIFT, Haar, LBP, and the like. In an example, the validation can be performed using a region in a particular frame, using respective regions in multiple frames, or using full-frame analysis.

In an example, the storage device 222 can include a training database including pre-loaded or known media such as including voice fingerprints or human face images or objects for comparison to a received image (e.g., image information received using the image sensor 114) during a detection process. The training database can include images of human faces in different positions and can include images of human faces having different sizes, shapes, genders, ages, hairstyles, clothing, facial adornments, and so on. In an example, the images can be positive image clips for positive identification of objects as human faces or can include negative image clips for positive identification of objects or non-human bodies. The training database can include images of different objects in different positions, including objects belonging to different classes. Object classes can include weapons, electronics, vehicles, carrying cases such as purses or duffle bags or backpacks, adornments such as hats, glasses, belts, holsters, or clothing.

In an example, the feature extractor engine 202 and/or components thereof can be provided in the form of hardware components or software entities or modules that can be implemented using a generic or purpose-built processor. In an example, the feature extractor engine 202 can be included in hardware or firmware of a camera, such as the image sensor 114, used to receive the image data, or can be included in a local or remote processing system. In an example, the feature extractor engine 202 can be a part of at least one of a mobile phone, a computer, a server, or a combination thereof.

Figure 4:
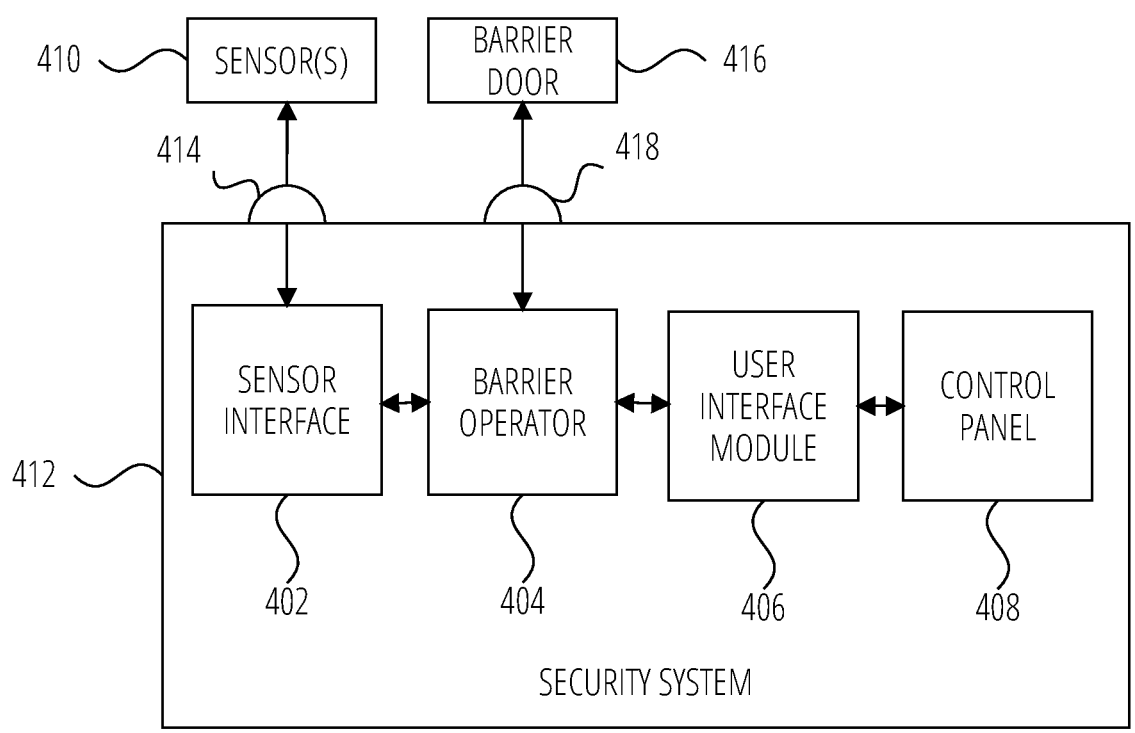
FIG. 4 illustrates components of a security system in accordance with an example.

Various algorithms, components, and processes for implementing human detection are discussed in U.S. Patent Application Publication No. 2017/0213081 ("the '081 publication"), titled "Methods and systems for automatically and accurately detecting human bodies in videos and/or images", which is hereby incorporated herein by reference in its entirety. Any one or more of the different algorithms, components, and processes in the '081 publication can similarly be applied in the context of the present application for the same or similar purpose of human identification in an image. For example, the '081 publication discusses using a Directional Weighted Gradient Histogram (DWGH) for detecting a human body in an image. The DWGH scheme can be used to provide better discrimination between positive and negative images. The '081 publication discusses using Latent Support Vector Machines (SVM) variables to improve detection accuracy. The '081 publication discusses enhancing processing speed and reducing false positives by using regions of detected motion and object tracking across frames. In FIG. 4, the '081 publication illustrates an exemplary method flowchart for detecting a body in an image based on a machine learning model including using deformable parts-based models for detecting human bodies, such as where one or more features are extracted for each part and are assembled to form descriptors based on pair-wise constraints. One or more of these features or aspects described in the '081 publication can be extended or applied to facial recognition or object recognition.

Referring again to FIG. 2, the feature extractor engine 202 can be implemented in whole or in part at or in hardware or software at or adjacent to a camera, such as in the first edge device 102 or elsewhere in the first system 100. In an example, implementation at the first edge device 102 can be referred to as edge processing or edge-based processing. In an example, edge processing at a camera device can be performed using machine learning models that are trained to work with an image in a YUV color space. In an example, edge processing can be performed using machine learning models that are trained to work exclusively on one element of a color space, such as using Y information only from a YUV color space. That is, in an example, color or chrominance information can be disregarded and brightness or luminance information can be used for image recognition processing. In an example, with less than all of YUV information being used by a processor, higher resolution analysis can be performed in a shorter amount of time or using fewer cycles than if all of the YUV information is used together.

In an example, the feature extractor engine 202 includes a deep learning-based engine with anti-spoofing features. For example, the feature extractor engine 202 can be configured to discriminate camera images of a person or people in an environment from a photograph presented to the camera where the photograph includes imagery of the same person or people. Such anti-spoofing can be critical for home or other security deployments such that an intruder cannot use a picture, e.g., of a homeowner, to enter monitored areas. Anti-spoofing processing by the feature extractor engine 202 also allows for conventional, single lens 2D cameras to check for a real person being present.

In an example, the feature extractor engine 202 can help address spoofing by analyzing features over multiple different video frames to identify a gesture or other movement by a person or object. The feature extractor engine 202 can identify a gesture, for example, by identifying a change in position and corresponding change in appearance over known or learned timescales. For example, the feature extractor engine 202 can be configured to extract feature information about a candidate face from multiple frames while a subject individual nods their head up and down. A nod gesture can be identified from the multiple frames by comparing, for example, facial feature position changes, such as can occur in a known or prescribed manner.

In an example, gestures can be further characterized or classified and can provide different inputs for an authentication system. For example, a rate or direction of a detected gesture can be configured or programmed to indicate duress, or to indicate access control should be based on other or additional means of authentication or validation.

Figure 3:
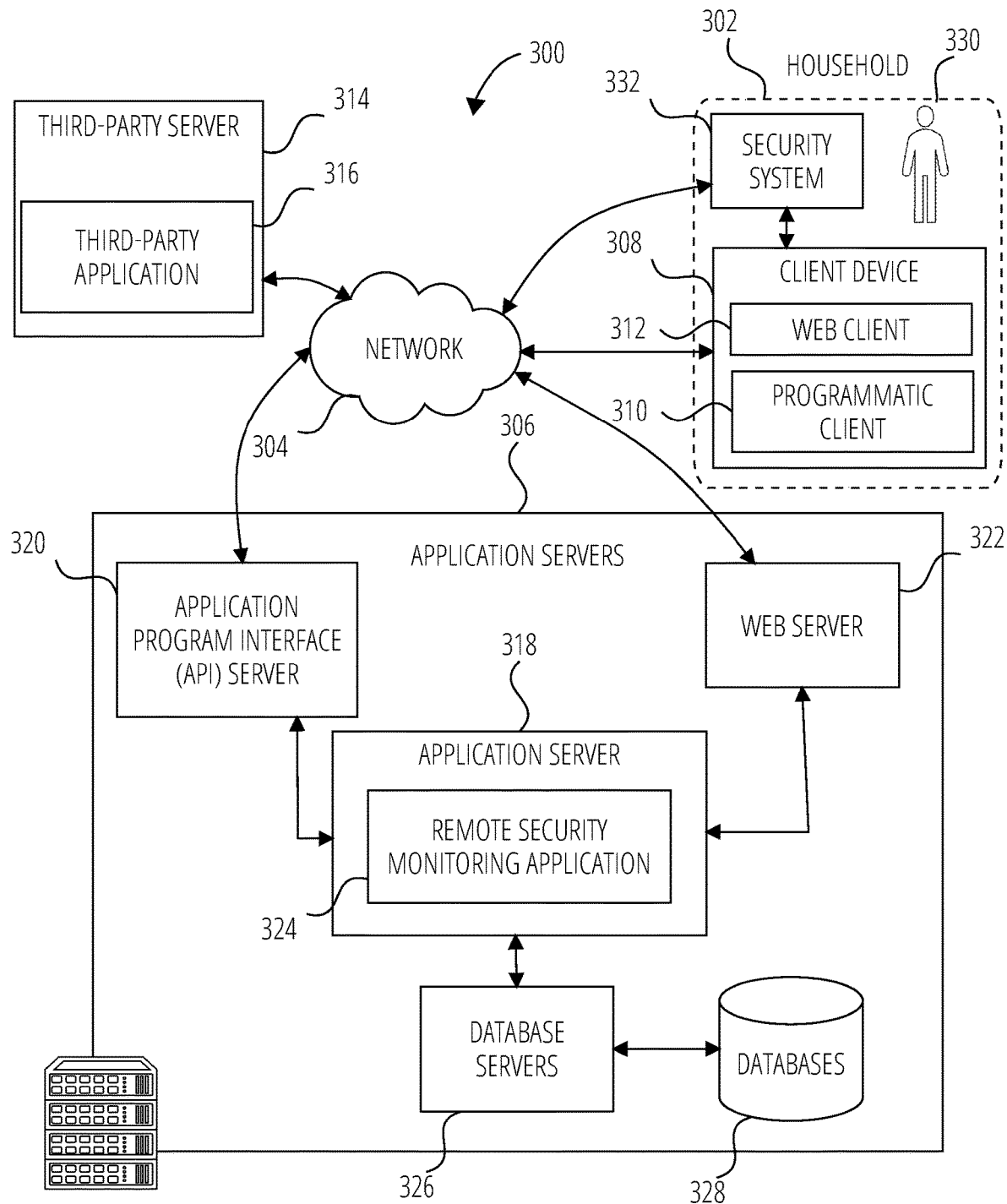
FIG. 3 is a diagrammatic representation of a networked environment in which the present disclosure may be deployed, in accordance with some examples.

FIG. 3 is a diagrammatic representation of an environment 300 in which some example embodiments of the present disclosure may be implemented or deployed. In the example, one or more application servers 306 provide server-side functionality via a network 304 to a networked user device, such as in the form of a security system 332 and a client device 308 of the user 330. In an example, the client device 308 comprises an example of the first edge device 102, or an example of the user device 126 of the first system 100, and the user 330 can comprise an authorized user or system administrator. The security system 332 can include a control panel (not shown) connected to sensors in a household 302 of the user 330. A web client 312 (e.g., a browser) and a programmatic client 310 (e.g., an "app") are hosted and execute on the client device 308. The client device 308 can communicate with the security system 332 via the network 304 or via other wireless or wired means with security system 332.

An Application Program Interface (API) server 320 and a web server 322 can provide respective programmatic and web interfaces to application servers 306. A specific application server 318 hosts a remote security monitoring application 324 that operates with the security system 332. In one example, the remote security monitoring application 324 receives an alert from a sensor of the security system 332, determines whether the alert corresponds to a known individual based on media information from the sensor, and communicates the alert to a control panel, to an access control device, a mobile device or elsewhere.

The web client 312 communicates with the remote security monitoring application 324 via the web interface supported by the web server 322. Similarly, the programmatic client 310 communicates with the remote security monitoring application 324 via the programmatic interface provided by the Application Program Interface (API) server 320. The third-party application 316 may, for example, be a topology application that determines the topology of an environment such as a factory, building, residence, apartment complex, or neighborhood. The application server 318 is shown to be communicatively coupled to database servers 326 that facilitates access to an information storage repository or databases 328. In an example embodiment, the databases 328 includes storage devices that store information to be published and/or processed by the remote security monitoring application 324.

Additionally, a third-party application 316 executing on a third-party server 314, is shown as having programmatic access to the application server 318 via the programmatic interface provided by the Application Program Interface (API) server 320. For example, the third-party application 316, using information retrieved from the application server 318, may support one or more features or functions on a website hosted by the third party. In one example, the third-party server 314 communicates with another remote controlled device (e.g., smart door lock) located at the household 302. The third-party server 314 provides the door lock status to the security system 332, the client device 308, or the application server 318. In another example, the security system 332, the client device 308, and the application server 318 can control the door lock via the third-party application 316.

FIG. 4 illustrates components of a security system in accordance with one example embodiment. The security system 412 can comprise an example of the first edge device 102. In an example, the security system 412 can include a sensor interface 402, a barrier operator 404, a user interface module 406, and a control panel 408.

The security system 412 communicates, via the sensor interface 402 and a sensor signal port 414, with one or more sensor(s) 410 disposed in a physical facility (e.g., a home, a building, a factory, a campus). For example, the sensor interface 402 identifies the sensor(s) 410 and accesses sensor data from the sensor(s) 410. In one example, the sensor(s) 410 are registered with the security system 412. In an example, the sensor(s) 410 can include the audio sensor 110 or the image sensor 114 or other biometric or physiologic sensor that is configured for use in authentication or system enrollment procedures.

The barrier operator 404 can be configured to communicate with or control a barrier door 416, such as using an access-control signal port 418. In an example, the barrier operator 404 can be configured to control multiple barriers or access control systems in an environment. For example, the barrier operator 404 can be configured to provide signals, using the access-control signal port 418, to lock or unlock gates or doors, open or close overhead doors or garage doors, or otherwise help control access to a protected environment. In an example, the barrier operator 404 can grant or deny access to an environment based on instructions from the processor circuit 118 in the first edge device 102, such as can be based on media that is analyzed using artificial intelligence to determine whether an authorized individual requested access or is present at a particular barrier location.

The user interface module 406 generates a user interface for the security system 412. In an example, the user interface module 406 can include or use the speaker 120 or the display 122 or the input device 128 of the first edge device 102. The control panel 408, such as can include the user interface module 406, can further include a user input, such as the input device 128, that enables a user, such as the user 330, to control behavior or features of the security system 412. In an example, the control panel 408 can be a virtual control panel that is accessed via a client, such as the user device 126, or other computing device registered with the security system 412.

Figure 5:
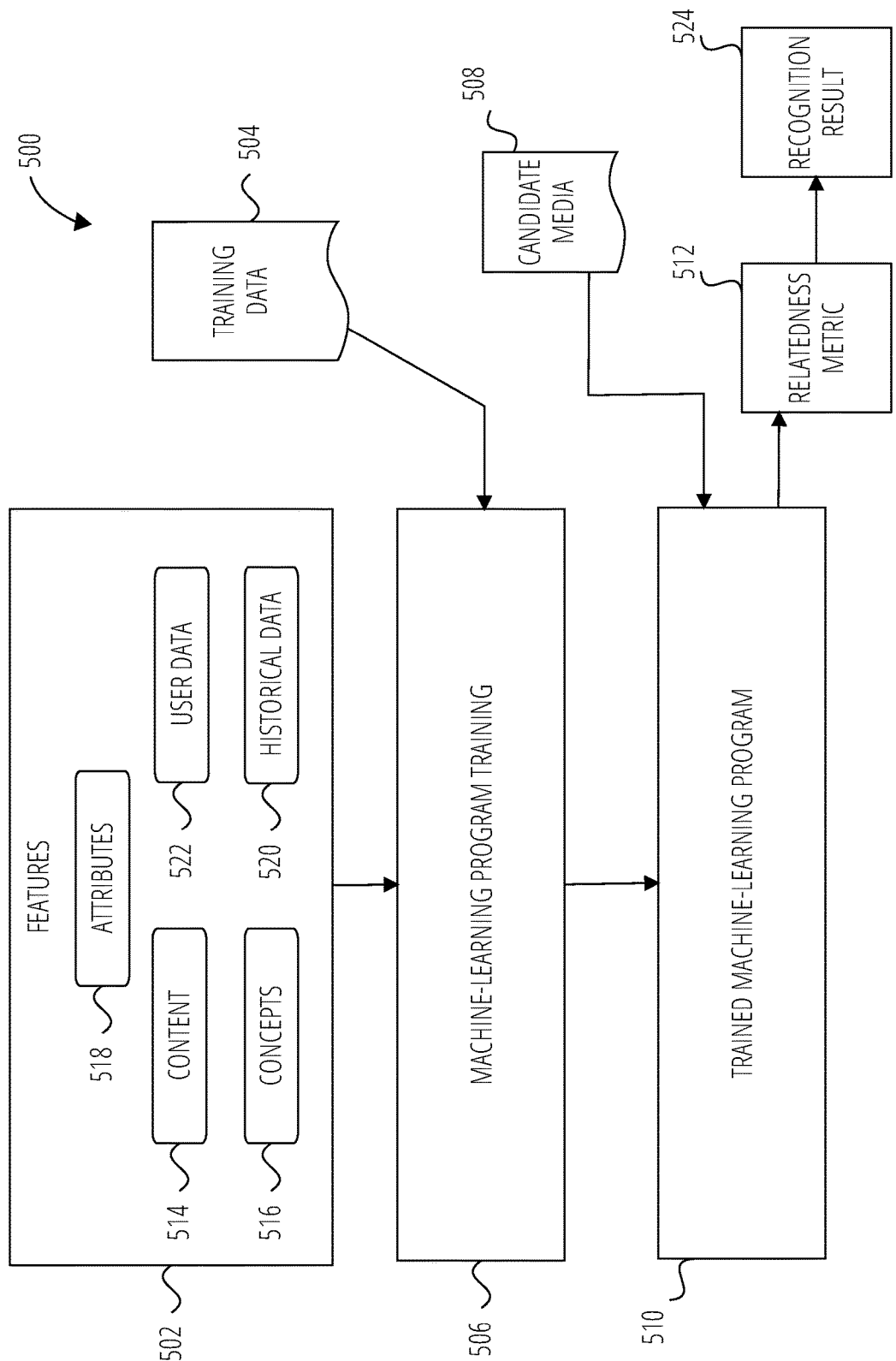
FIG. 5 illustrates generally an example of training and use of a machine-learning program.

FIG. 5 illustrates training and use of a machine-learning system 500, according to some example embodiments. In some example embodiments, machine-learning (ML) programs, also referred to as machine-learning algorithms, can be used to perform operations for user recognition or authentication. In an example, the machine-learning system 500 can comprise a portion of the first system 100, or can be implemented using the first edge device 102, the remote server 104, or the user device 126. In the example of FIG. 5, the machine-learning system 500 includes machine-learning program training 506, such as can use training data 504 or various features 502, to provide a trained machine-learning program 510. The trained machine-learning program 510 can receive candidate media 508 and, in response, provide a relatedness metric 512 or value indicating whether an individual identified in the candidate media 508 can be authenticated. In an example, the trained machine-learning program 510 can provide a recognition result 524 that can be based on the relatedness metric 512. The recognition result 524 can include information about who or what is determined to be present in the candidate media 508. For example, the recognition result 524 can include information about one or more individuals identified in an image frame or series of image frames, or can include information about one or more individuals identified in an audio sample.

In machine learning, computers or processors can be programmed to learn or acquire new information, from or with which later decisions can be made, without being explicitly programmed. Machine learning explores the study and construction of algorithms that can learn from existing data and make predictions about new data. Such machine-learning can operate by building a model from example training data 504 or reference information in order to make data-driven predictions or decisions expressed as outputs or assessments (e.g., as a relatedness metric 512). Although example embodiments are presented with respect to a few machine-learning tools, the principles presented herein may be applied to other machine-learning tools or algorithms. Various algorithms can be used, for example, Logistic Regression (LR), Naive-Bayes, Random Forest (RF), neural networks (NN), matrix factorization, and Support Vector Machines (SVM) can be used for classification, or recognition, such as to determine a relatedness between different media samples.

Two common types of problems in machine learning are classification problems and regression problems. Classification problems, also referred to as categorization problems, aim at classifying items into one of several category values (for example, is a particular object in an image a person or an inanimate object). Regression algorithms aim at quantifying some items (for example, by providing a value that is a real number). In some examples, classification and regression can be used together. In some examples, machine learning can be used to determine a relatedness metric that places a value on how related two or more media samples are. A recognition result 524 can be provided based on the relatedness metric 512. In an example, various decisions can be made by a system based on a value of the relatedness metric 512 or on a recognition result 524, for example, access control decisions.

The machine-learning algorithms use features 502, such as can be determined or extracted using the feature extractor engine 202, for analyzing data to generate a relatedness metric 512 or a recognition result 524. In an example, a feature can include a measurable or identifiable characteristic or property of all or a portion of a media sample. Each of multiple features 502 can be an individual measurable property of a phenomenon being observed. The concept of a feature is related to that of an explanatory variable used in statistical techniques such as linear regression. Choosing informative, discriminating, and independent features can be important for the effective operation of an ML algorithm such as for pattern recognition, classification, or regression. Features can be of different types, such as numeric features, strings, and graphs. In an example, the features 502 can be different types and can include one or more of content 514 (e.g., objects or people present in an image; words spoken by an individual), concepts 516, attributes 518 (e.g., features extracted from or used to characterize a particular face image or audio sample), historical data 520 and/or user data 522, for example.

A machine-learning algorithm can use the training data 504 to find correlations among the identified features 502 that affect an outcome or assessment or analysis result, such as can include a relatedness metric 512 or a recognition result 524. In some examples, the training data 504 includes labeled data, which is known data for one or more identified features 502 and one or more outcomes, such as detecting communication patterns, detecting the meaning of a message, generating a summary of a message, detecting action items in a message, detecting urgency in a message, detecting a relationship of a user to an enrolled individual, calculating score attributes, calculating message scores, etc. In an example, the training data 504 comprises enrollment data for one or multiple individuals associated with a security system. For example, the training data 504 can include face images or voice prints or biometric or physiologic signals that are identified with a particular individual and corresponding access levels for the individual. The access levels can include, for example, information about whether the individual is permitted to access particular locations that are protected by one or more barriers or alarms, such as where access can be controlled using the barrier operator 404. The access levels can include information about whether the individual is restricted from accessing particular locations. In an example, the access levels can be defined for groups of people, or can be controlled based on a detected presence or absence of one or more objects.

With the training data 504 and the identified features 502, the machine-learning algorithm can be trained at block machine-learning program training 506. The machine-learning algorithm can be configured to appraise relationships or correlations between the various features 502 and the training data 504. A result of the training can be a trained machine-learning program 510. When the trained machine-learning program 510 is used to perform an assessment, candidate media 508 is provided as an input to the trained machine-learning program 510, and the trained machine-learning program 510 generates the relatedness metric 512 or the recognition result 524 as output. In an example, the relatedness metric 512 includes a value (e.g., a numerical value or other indicator) that indicates whether a particular individual identified in the candidate media 508 can be authenticated or matched with a known individual. The recognition result 524 can include a binary result indicating recognition or identification of a particular individual or object, or can include a binary result indicating permission or denial of access to a particular protected area or environment.

Figure 6:
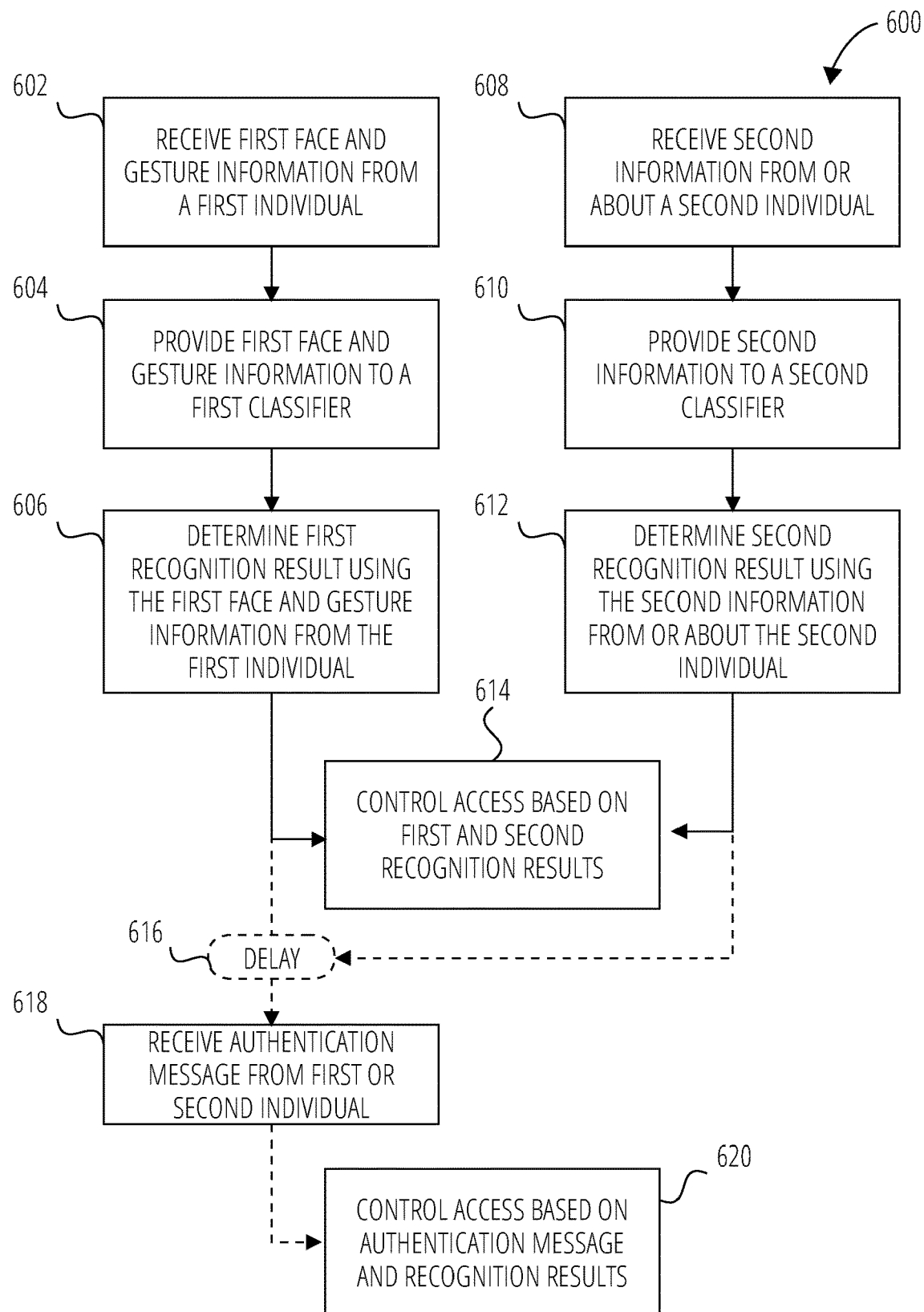
FIG. 6 illustrates generally an example of a multiple-factor authentication method for access control.

FIG. 6 illustrates generally an example of a first method 600 that can include controlling access based on multiple recognition results. In an example, the first method 600 includes controlling operation of a barrier door 416, such as to control access to a protected environment. In an example, the first method 600 includes using the recognition results 524 from the trained machine-learning program 510. In an example, the first method 600 includes or uses image information, such as can be received using the image sensor 114 of the first edge device 102.

The first method 600 can include, at block 602, receiving first face and gesture information, such as from or about a first individual. The information can be received at block 602 using, for example, the image sensor 114, or other image sensor or image input device, such as can include a full-color image, a black-and-white image, color image, an image represented in YUV space, depth information from a depth sensor, IR information, heat information, or other information from which facial features or gestures can be identified by, e.g., the image processor circuit 116. The face and gesture information can include face image information received in one or more frames, and the gesture information can include information determined or discerned from the same or other frames. In an example, the face and gesture information corresponds to the same first individual, or can correspond to different individuals. The gesture information can include information about a movement or motion of a body or an object. The movement or motion can be enrolled or programmed into a recognition system, such as the machine-learning system 500, or can be learned by the system.

At block 604, the first method 600 can include providing the first face and gesture information to a first classifier. For example, block 604 can include providing the information to the trained machine-learning program 510. At block 606, the first method 600 can include using the trained machine-learning program 510 to determine a first image recognition result using the first face and gesture information. For example, block 606 can include determining a relatedness (e.g., the relatedness metric 512) or a recognition result (e.g., the recognition result 524) for each of the first face information and the gesture information to determine whether a particular first individual can be positively identified. In an example, a relatively high value of the relatedness metric 512 or recognition result 524 for face recognition can be combined with a relatively low value of the relatedness metric 512 or recognition result 524 for gesture recognition and can result in a positive identification, or vice versa. In an example, sufficiently highly valued (e.g., greater than a specified threshold value) relatedness metrics and recognition results can yield positive identification, while a low value on either or both of a relatedness metric and recognition result can cause recognition to fail.

At block 608, the first method 600 can include receiving second information from or about a second individual. The second information can be received at block 608 using, for example, the image sensor 114, the audio sensor 110, or the input device 128, or other sensor or input configured to sense feature information about an individual. In an example, the second information received at block 608 includes the same images or frames received at block 602. That is, the information received at block 602 can comprise a portion of a frame, and the information received at block 608 can comprise a different portion of the same frame.

At block 610, the first method 600 can include providing the second information to a second classifier. For example, block 610 can include providing the information to the trained machine-learning program 510. At block 612, the first method 600 can include using the trained machine-learning program 510 to determine a second recognition result using the second information received at block 608. In an example, the second information includes image information, the second classifier is an image classifier, and block 612 includes determining a second image recognition result using the second face information. In an example, block 612 can include determining a relatedness (e.g., the relatedness metric 512) or a recognition result (e.g., the recognition result 524) for the second information to determine whether a particular second individual can be positively identified. In an example, multiple factors can be used to determine the second recognition result at block 612, such as gesture information or audio information or other authentication information that can be received from or about the second individual. For brevity, discussion of such multiple factors for recognition of the second individual is omitted.

At block 614, the first method 600 can include controlling access based on the first recognition result from block 606 and on the second recognition result from block 612. That is, the first method 600 can include using the first recognition result from block 606, such as based on face and gesture information, and can use the second recognition result from block 612, to control or condition access, such as to a protected environment, such as by providing conditional instructions for control of a barrier, such as the barrier door 416. In an example, block 614 can include determining or providing an access level based on the first and second recognition results. For example, a first lesser access level can be provided when the first and second recognition results indicate at least one individual has less than full clearance, and a second greater access level can be provided when the first and second recognition results indicate individuals that each have full clearance.

The first method 600 of FIG. 6 thus illustrates generally that multiple different factors can be used to control access to a protected environment. The first method 600 can help mitigate or avoid providing access to a protected area when, for example, an authorized individual (e.g., the first individual) is determined to be in the presence of an unknown individual or a known bad actor (e.g., the second individual). Similarly, the detected presence of an unknown individual or a known bad actor can be used to disqualify an otherwise permitted first individual.

In an example, the first method 600 can include or use additional means or methods for authentication or recognition. For example, before permitting or denying access at block 614, the first method 600 can include or use a time delay 616. In an example, the delay 616 can be used if the second recognition result, such as determined at block 612, is inconclusive or indicates a bad actor. The time delay can be used, for example, to automatically issue an alert to a third party, a system administrator, police, or other authority.

In an example, at block 618, the first method 600 can include receiving an authentication message from the first or second individual, such as following the delay 616. In an example, the authentication message can include a verbal or spoken passcode that can be received using the audio sensor 110, or can include a password or passcode that can be received using the input device 128. Following receipt of the authentication message at block 618, the first method 600 can continue at block 620 by controlling access based on the authentication message received at block 618 and on one or both of the first recognition result from block 606 and the second recognition result from block 612. In an example, block 620 can include updating an access level that can be set or determined at block 614. For example, block 620 can include using the authentication message to override a negative recognition result, or to change a permission level to use a more permissive or less permissive access control threshold.

Figure 7:
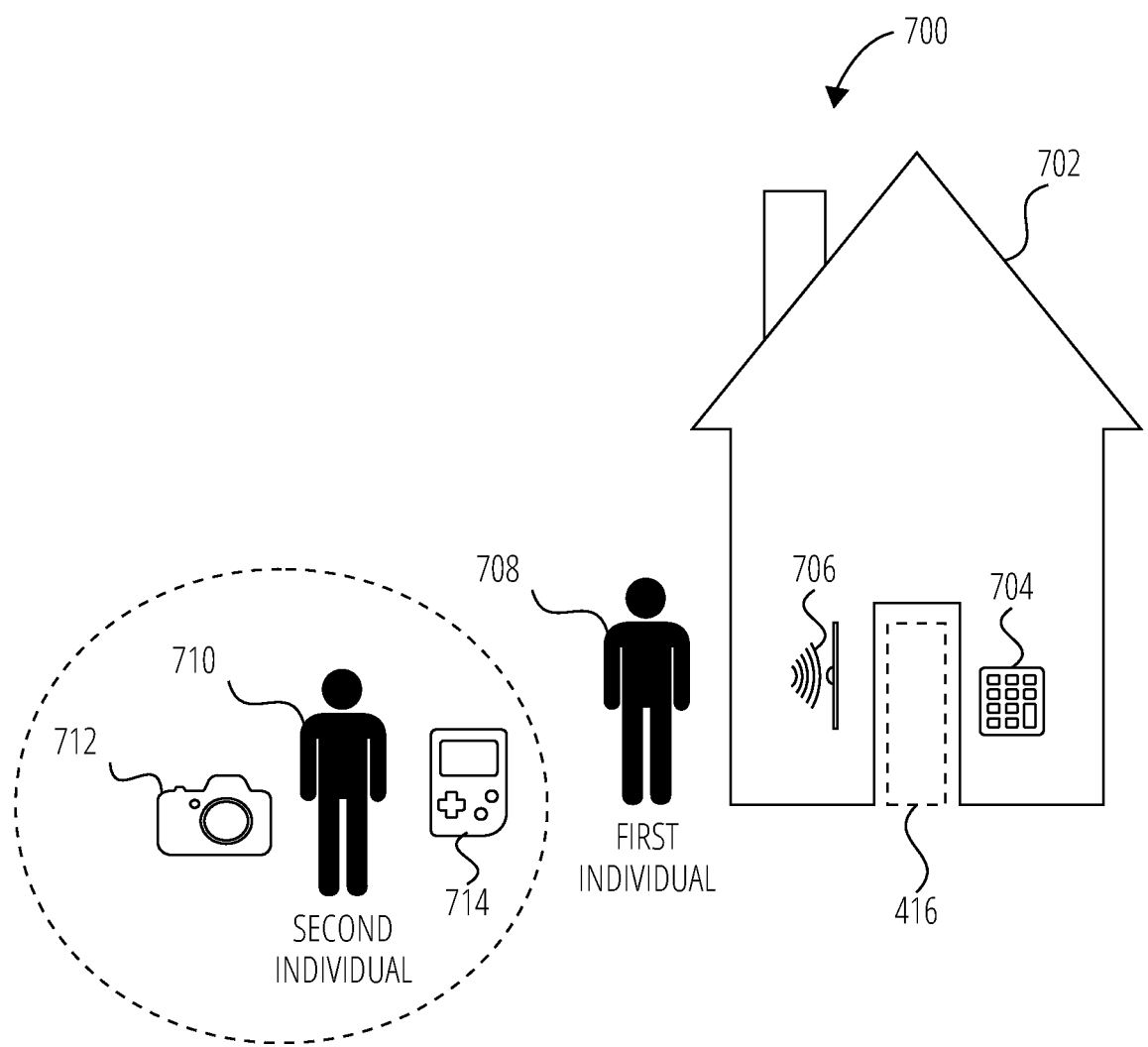
FIG. 7 illustrates generally an example of a first access-control scenario.

FIG. 7 illustrates generally an example of a first access-control scenario 700. In an example, the first method 600 of FIG. 6 can be performed or applied in the context of the first access-control scenario 700. The first access-control scenario 700 can include a protected environment 702, such as can include one or more protected areas to which access is controlled by the barrier door 416. The protected environment 702 can include a security system, such as can include a camera 706 and an alphanumeric input device 704. In an example, the security system for the protected environment 702 includes a control panel such as the first edge device 102. The camera 706 can comprise an example of the image sensor 114, and the alphanumeric input device 704 can comprise an example of the input device 128.

In the first access-control scenario 700, a first individual 708 can be present in the vicinity of the protected environment 702, such as in a field of view of the camera 706. A second individual 710 can be present in the same vicinity of the protected environment 702, such as in the field of view of the camera 706. In an example, the security system that protects or monitors the protected environment 702 can be configured to receive image information about the protected environment 702, and the image information can include information about the first individual 708 and the second individual 710. The image information can include multiple frames of information that include information about a gesture, such as a gesture performed by the first individual 708.

In an example, the machine-learning system 500 can be configured to receive the image information from the security system and extract one or more features, such as using the feature extractor engine 202. The machine-learning system 500 can receive the features or images as candidate information to be classified or identified. For example, the trained machine-learning program 510 can use the first method 600, such as at block 602, block 604, or block 606, to receive face and gesture information from the first individual 708 and provide a first recognition result about the first individual 708. The trained machine-learning program 510 can use the first method 600, such as at block 608, block 610, or block 612, to receive other second information, such as including face information, from the second individual 710, and can provide a second recognition result about the second individual 710. The first and second recognition results can be used by the security system to control access to the protected environment 702.

In an example, the security system can be configured to detect and classify one or more objects in a field of view of the camera 706. For example, various candidate objects, such as a prohibited object 712 or a permitted object 714 can be detected in the field of view, or can be detected or determined to be associated with one of the first individual 708 or the second individual 710. In an example, the machine-learning system 500 can be configured to receive image information about the objects, and to classify the objects as belonging to groups or classes of objects that are known to be permitted in or prohibited from entering the protected environment 702.

In the first access-control scenario 700, a handheld camera can belong to a class of prohibited items or objects. Accordingly, when the security system identifies a handheld camera, such as the prohibited object 712, access can be denied to the first individual 708 and the second individual 710. In an example, the access control can be overridden using an override code, such as can be received by the security system using the alphanumeric input device 704. In other words, access to the protected environment 702 can be conditioned on a determined class of one or more objects detected in the vicinity of the environment.

In an example, the security system can be configured to identify objects in the vicinity of the protected environment 702 with various levels of granularity. For example, the system can be configured to use the machine-learning system 500 to identify objects in the environment as portable electronics, and portable electronics can be categorically prohibited in the protected environment 702. In another example, the system can be configured to identify the particular objects in the environment as a handheld camera and a handheld gaming device, and to differently classify the objects. For example, the system can identify the handheld camera as a prohibited electronic device, or can identify the handheld gaming device as a permitted electronic device. Access can be controlled accordingly.

In an example, the security system or the machine-learning system 500 can be configured to apply different permissions or access controls based on whether a prohibited object is detected in the vicinity of, or coupled to, a particular individual. For example, if an object in a prohibited class (e.g., a weapon) is detected appurtenant to a first individual who is authenticated using face recognition and gesture recognition, then the prohibited status of the object can be disregarded and access can be granted. Similarly, if a first individual is known to be a member of a permitted class, such as a class of safety officers, then otherwise-prohibited objects appurtenant to such an individual can be permitted, or classifications of such objects can be automatically disregarded or unused by the access controller.

Figure 8:
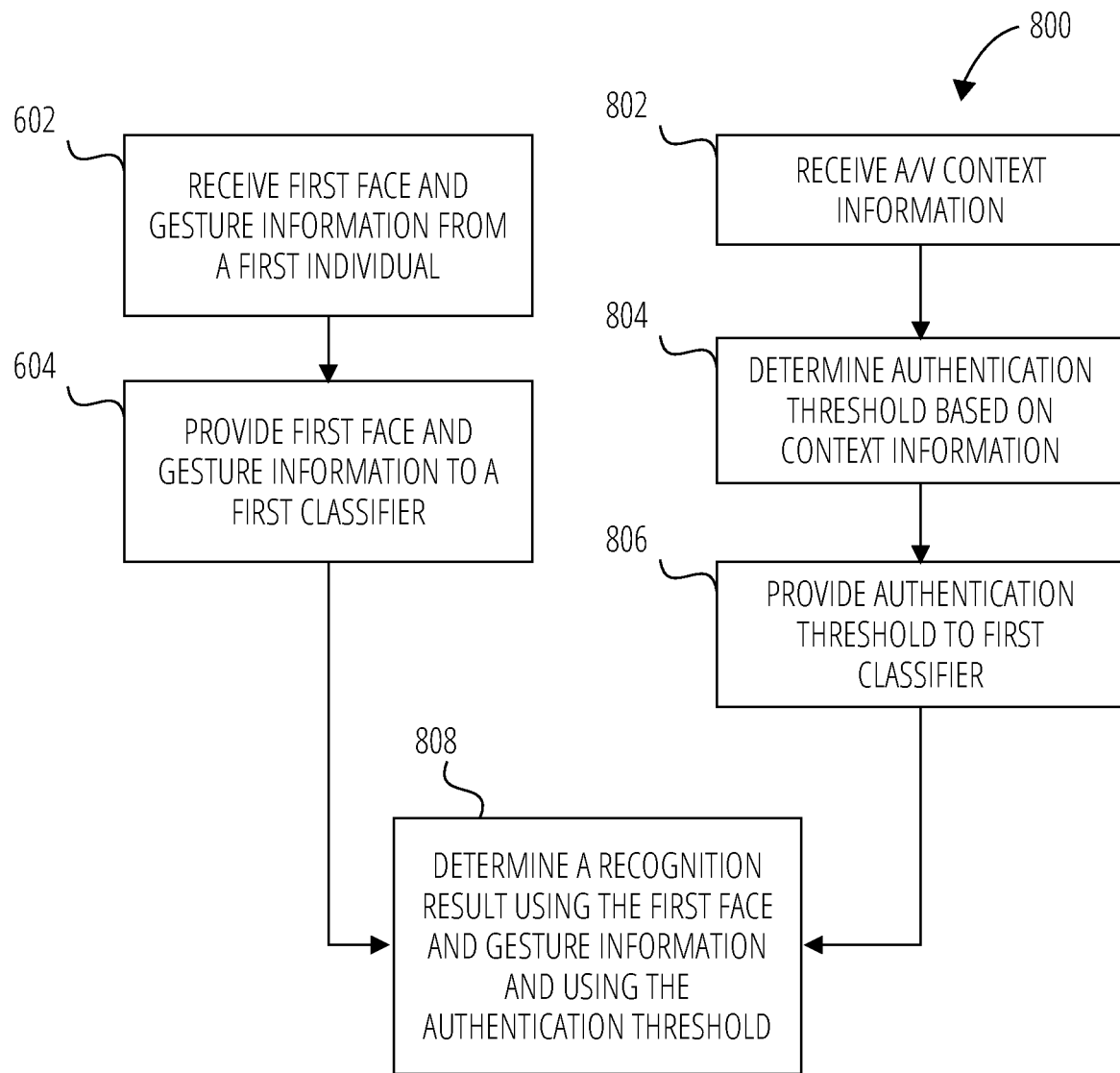
FIG. 8 illustrates generally an example of a method that includes determining an authentication threshold based on context information.

FIG. 8 illustrates generally an example of a second method 800 that can include changing or updating an authentication or recognition threshold used to determine a recognition result. The threshold can be a value or metric against which a relatedness metric can be compared to determine whether authentication or recognition is successful or unsuccessful. For example, the authentication threshold can indicate a quantifiable amount of similarity between reference information (e.g., information known by or enrolled with the trained machine-learning program 510) and candidate information (e.g., candidate media 508) to provide a positive recognition result.

Figure 9:
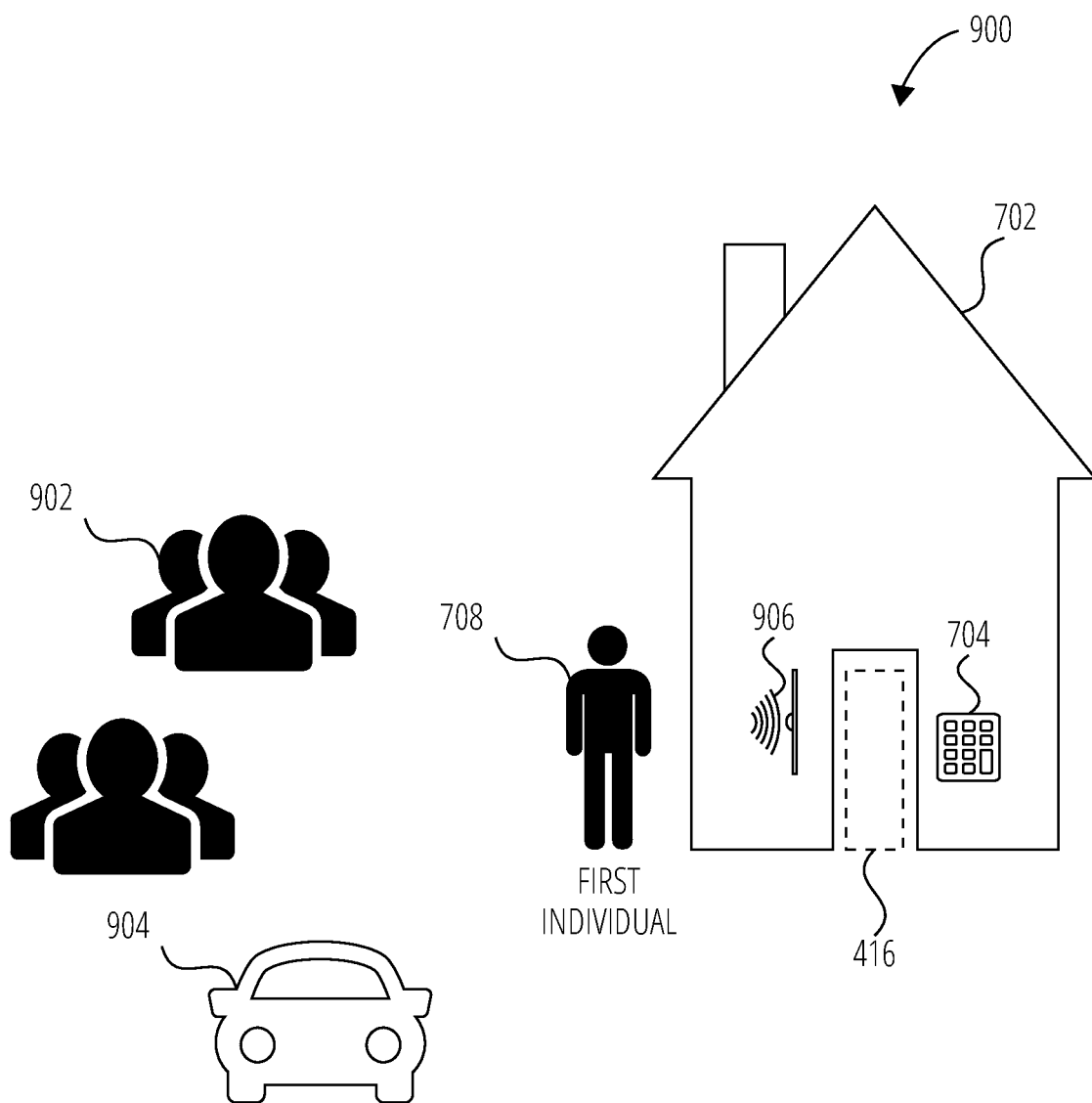
FIG. 9 illustrates generally an example of a second access-control scenario.

The example of the second method 800 will be discussed herein the context of a second access-control scenario 900 shown in FIG. 9. The example of the second access-control scenario 900 includes the protected environment 702, access to which can be controlled by a security system that controls the barrier door 416. The security system can include the alphanumeric input device 704 and one or more other input devices, such as an AV sensor 906. In an example, the AV sensor 906 includes audio and/or video or image sensors. In the example of FIG. 9, the first individual 708, a crowd 902, and a vehicle 904 are in the vicinity of the protected environment 702. In an example, the AV sensor 906 can sense or receive image information or acoustic information from or about one or more of the first individual 708, the crowd 902, or the vehicle 904.

Returning to the second method 800, at block 808, the example can include steps that include the block 602 and the block 604. At block 602, the example can include receiving first face and gesture information from a first individual, such as the first individual 708. At block 604, the example can include providing the first face and gesture information to a first classifier, such as the trained machine-learning program 510.

At block 802, the second method 800 can include receiving audiovisual context information from the vicinity of a protected environment. For example, block 802 can include using the AV sensor 906 to sense audio or video information from the vicinity of the protected environment 702. For example, block 802 can include receiving background noise information using an audio sensor. The noise information can be analyzed using the trained machine-learning program 510, such as to identify a presence or absence of one or more known or unknown individuals or objects. For example, the trained machine-learning program 510 can be configured to determine whether a crowd is or is likely to be present near the barrier door 416, or can be configured to determine whether a known or unknown vehicle is present near the barrier door 416. The crowd 902 or the vehicle 904 can be positively identified, or identified as an unknown crowd or vehicle, using the trained machine-learning program 510.

At block 804, the second method 800 can include determining an authentication threshold based on the context information received at block 802. For example, block 804 can include determining whether a higher authentication threshold or lower authentication threshold should be used. In an example, a higher authentication threshold can include or use more factors to control access to the protected environment 702, while a lower authentication threshold can include or use fewer factors to control the same access. At block 806, the second method 800 can include providing the authentication threshold to a first classifier, such as the trained machine-learning program 510. That is, block 806 can include providing the authentication threshold as-determined to the same classifier or ML or DL system that is used to analyze the first face and first gesture information from the first individual 708.

At block 808, the second method 800 can include determining a recognition result using the first face and gesture information received at block 602, and can include determining the recognition result using the authentication threshold determined at block 806. In an example, block 808 can include using the trained machine-learning program 510, or other classifier or ML or DL system, to analyze the face and gesture information and, based on the authentication threshold, provide a recognition result. For example, if the authentication threshold is relatively low, then a positive recognition result can be provided based on face recognition results, such as without using or requiring gesture information. In an example, if the authentication threshold is relatively high, then a positive recognition result can be provided based on multiple-feature face recognition and gesture information together.

Accordingly, recognition results, such as the recognition result 524 from the trained machine-learning program 510, can be based on different threshold levels of authentication, such as can be adjusted substantially in real-time to adapt to changing real-world conditions. For example, different authentication thresholds can be used when the first individual 708 is alone (e.g., a lower threshold) versus when the first individual 708 is accompanied by a crowd (e.g., a higher threshold) or when the first individual 708 is in the company of a known or unknown object such as the vehicle 904.

Figure 10:
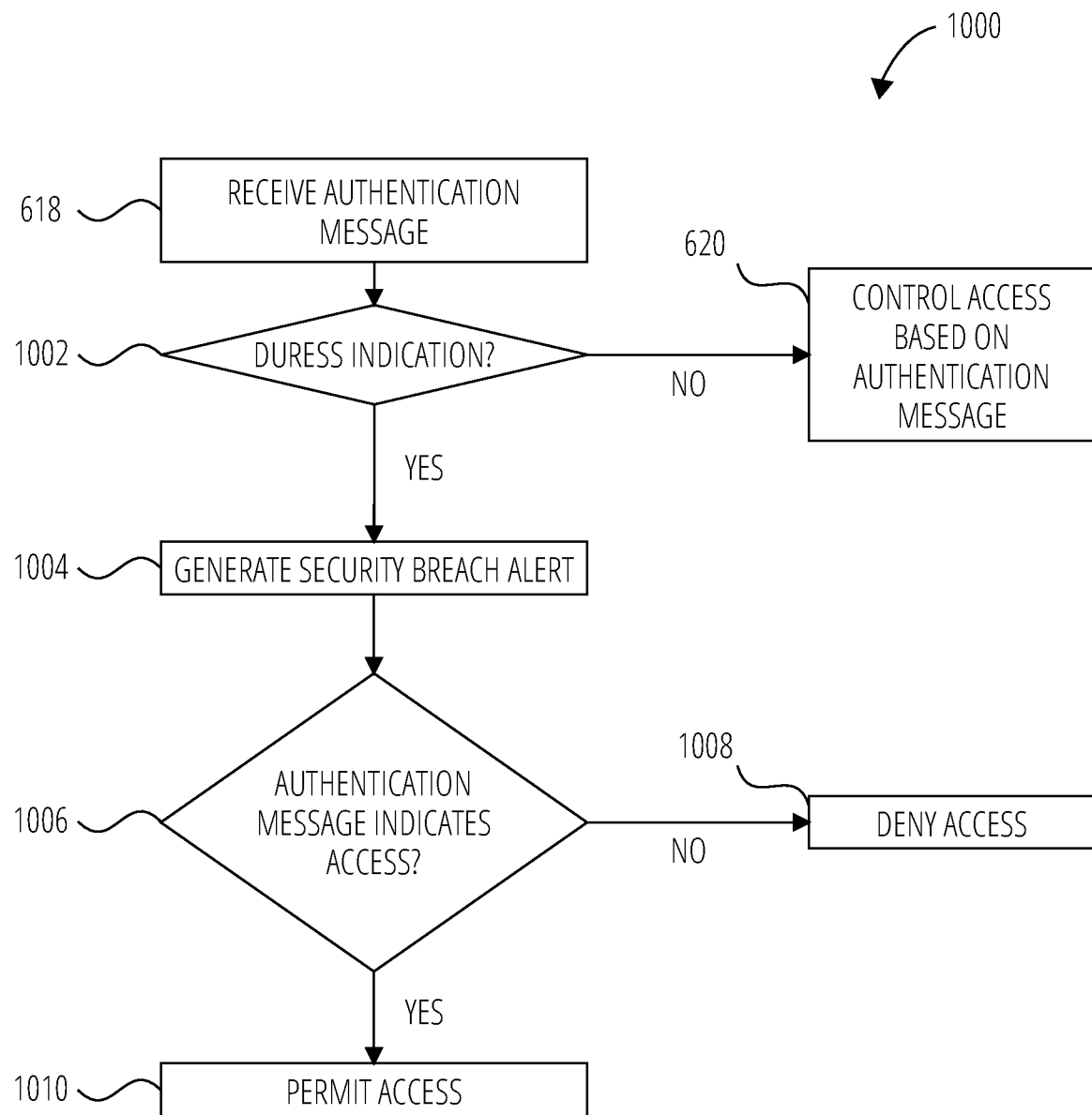
FIG. 10 illustrates generally an example of a method that includes managing a duress indication.

FIG. 10 illustrates generally an example of a third method 1000 that can include receiving and using an authentication message. For example, the third method 1000 can include receiving the authentication message at block 618 from the example of FIG. 6. In an example, the authentication message can include a passcode, an audio or voice signature, a biometric signal, or other means of authentication. The authentication message can be received by or interpreted by the first edge device 102, or the user device 126, or the client device 308, or the security system 332, or the security system 412, or the trained machine-learning program 510.

At decision block 1002, the third method 1000 can include determining whether the authentication message indicates duress. Whether a message indicates duress can be set or programmed into a system, such as during an enrollment or setup procedure. For example, one or more authenticated users can program the system to recognize one or multiple codes, any one of which can be associated with duress. If, at decision block 1002, the authentication message does not indicate duress, then the third method 1000 can proceed to control access based on other recognition results or based on the non-duress content of the authentication message, such as at block 620. In an example, the non-duress content can specify an access level or other information for use by a security system in controlling access.

If, at decision block 1002, the authentication message indicates duress, then the third method 1000 can proceed to block 1004 and generate a security breach alert. The alert can be a silent alert or an audible alarm or a visual alarm. In an example, a silent alert can include a signal that is sent to a monitoring system, police, or other authority. In an example, the silent alert can include information sensed or received from the protected environment, such as including image or audio information.

In an example, an authentication message can indicate duress and can indicate access. That is, in some examples, it may be useful to have a duress code that triggers a security breach alert (e.g., a silent alert) but nevertheless grants access. Such a code can be useful when, for example, the first individual 708 feels threatened by an assailant but may not want to make an assailant aware that authorities were contacted, such as out of fear of reprisal for triggering an alarm. Different system responses or alerts to respective different duress codes can be programmed into the system.

At decision block 1006, the third method 1000 can include determining whether the authentication message indicates access. If the authentication message indicates that access should be denied or does not affirmatively indicate access, then the third method 1000 can include denying access to a protected environment at block 1008. If the authentication message indicates that access should be granted, then the third method 1000 can include permitting access to the protected environment at block 1010.

Figure 11:
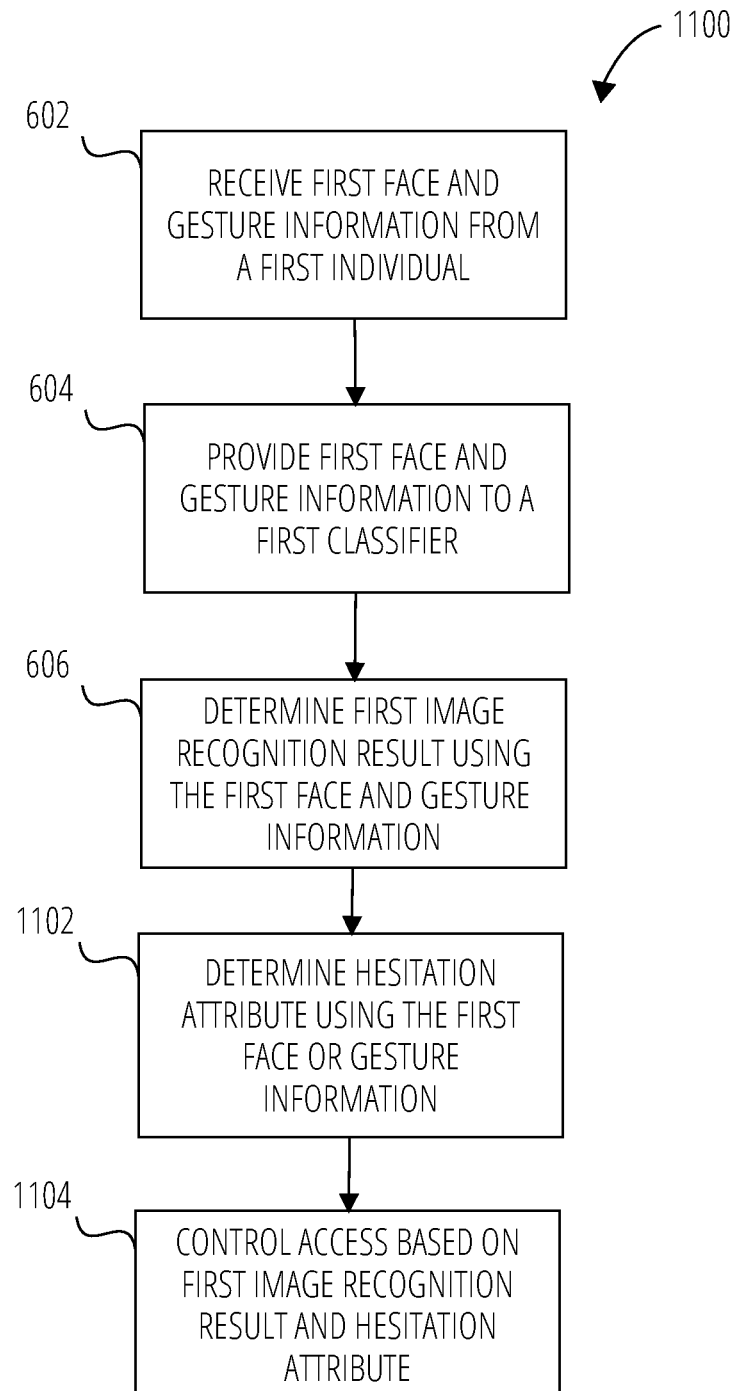
FIG. 11 illustrates generally an example of a method that includes using a hesitation attribute.

The example of FIG. 10 indicates generally how an affirmative input can be used to indicate duress. FIG. 11 illustrates generally a fourth method 1100 that can include or use information about hesitation, such as can be detected without an affirmative input, to indicate duress and control access. The example of the fourth method 1100 can begin with block 602, block 604, and block 606 from the example of FIG. 6. That is, the fourth method 1100 can include receiving face and gesture information, such as from image information about a first individual. The face and gesture information can be provided to a classifier, such as the trained machine-learning program 510, and the classifier can determine a first recognition result using the first face and gesture information.

In an example, the fourth method 1100 can include, at block 1102, determining a hesitation attribute, such as using the same first face or gesture information from the first individual. That is, the same information can be used at block 606 and block 1102 to determine a recognition result and to determine whether the individual exhibits a hesitation attribute. The hesitation attribute can be, for example, a delay, a shaky or unsteady voice, or body movements or unsteadiness such as in extremities like hands, fingers, or other body parts. The hesitation attribute can be, for example, unusual eye movements, mouth movements, or other behavior such as body shaking or movement (e.g., walking, jumping, head movements, etc.) that are known by the system, or learned by the system, to be unusual for the first individual. In an example, the hesitation attribute can include skin tone or voice pitch. In an example, the hesitation attribute can be a time delay between keystrokes of a passcode entry, or can be a time delay before entry of a passcode, such as after prompting.

At block 1104, the fourth method 1100 can include controlling access to a protected environment based on the image recognition result, such as from block 606, and based on the hesitation attribute, such as from block 1102. For example, if no hesitation attribute is detected, then access can be controlled normally. If hesitation is detected, then access can be denied, or an access control threshold or authentication threshold can be adjusted or updated.

Figure 12:
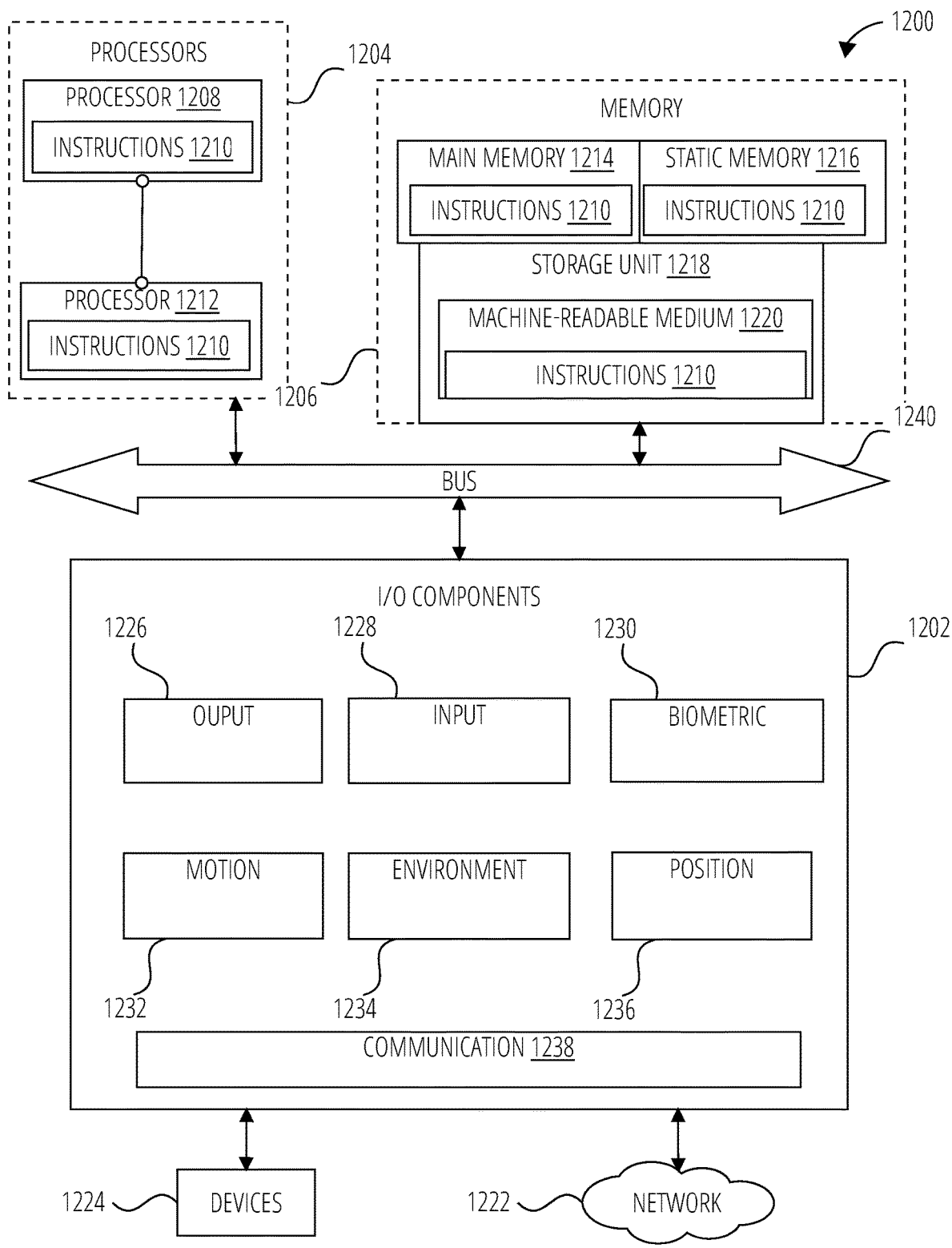
FIG. 12 is a diagrammatic representation of a machine in the form of a computer system within which a set of instructions may be executed for causing the machine to perform any one or more of the methodologies discussed herein, in accordance with some examples.

FIG. 12 is a diagrammatic representation of the machine 1200 within which instructions 1210 (e.g., software, a program, an application, an applet, an app, or other executable code) for causing the machine 1200 to perform any one or more of the methodologies discussed herein may be executed. For example, the instructions 1210 may cause the machine 1200 to execute any one or more of the methods described herein. The instructions 1210 transform the general, non-programmed machine 1200 into a particular machine 1200 programmed to carry out the described and illustrated functions in the manner described, for example, as an artificial intelligence-enabled analyzer that is configured to implement one or more of neural networks, machine learning algorithms, or other automated decision-making algorithm. The machine 1200 can operate as a standalone device or can be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance) or other smart device, a web appliance, a network router, a network switch, a network bridge, or any machine capable of executing the instructions 1210, sequentially or otherwise, that specify actions to be taken by the machine 1200. Further, while only a single machine 1200 is illustrated, the term "machine" shall also be taken to include a collection of machines that individually or jointly execute the instructions 1210 to perform any one or more of the methodologies discussed herein.

The machine 1200 may include processors 1204, memory 1206, and I/O components 1202, which may be configured to communicate with each other via a bus 1240. In an example embodiment, the processors 1204 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another processor, or any suitable combination thereof) may include, for example, a Processor 1208 and a Processor 1212 that execute the instructions 1210. The term "Processor" is intended to include multi-core processors that may comprise two or more independent processors (sometimes referred to as "cores") that may execute instructions contemporaneously. Although FIG. 12 shows multiple processors 1204, the machine 1200 may include a single Processor with a single core, a single Processor with multiple cores (e.g., a multi-core Processor), multiple processors with a single core, multiple processors with multiples cores, or any combination thereof. In an example, the processors 1204 can include or comprise one or more of the processors in the first system 100.

The memory 1206 includes a main memory 1214, a static memory 1216, and a storage unit 1218, both accessible to the processors 1204 via the bus 1240. The main memory 1206, the static memory 1216, and storage unit 1218 store the instructions 1210 embodying any one or more of the methodologies or functions described herein. The instructions 1210 may also reside, completely or partially, within the main memory 1214, within the static memory 1216, within machine-readable medium 1220 within the storage unit 1218, within at least one of the processors 1204 (e.g., within the Processor's cache memory), or any suitable combination thereof, during execution thereof by the machine 1200.

The I/O components 1202 may include a wide variety of components to receive input, provide output, produce output, transmit information, exchange information, capture measurements, and so on. The specific/O components 1202 that are included in a particular machine will depend on the type of machine or the type of media to be received or provided or processed. For example, portable machines such as mobile phones may include a touch input device or other such input mechanisms, while a headless server machine will likely not include such a touch input device. It will be appreciated that the I/O components 1202 may include many other components that are not shown in FIG. 12. In various example embodiments, the/O components 1202 may include output components 1226 and input components 1228. The output components 1226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1228 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1202 may include biometric components 1230, motion components 1232, environmental components 1234, or position components 1236, among a wide array of other components. For example, the biometric components 1230 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1232 include acceleration sensor components (e.g., accelerometer), gravitation sensor components, rotation sensor components (e.g., gyroscope). The environmental components 1234 include, for example, one or cameras, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1236 include location sensor components (e.g., a GPS receiver Component), altitude sensor components (e.g., altimeters or barometers that detect air pressure from which altitude may be derived), orientation sensor components (e.g., magnetometers), and the like.

Communication may be implemented using a wide variety of technologies. The I/O components 1202 further include communication components 1238 operable to couple the machine 1200 to a network 1222 or devices 1224 via respective coupling or connections. For example, the communication components 1238 may include a network interface Component or another suitable device to interface with the network 1222. In further examples, the communication components 1238 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1224 may be another machine or any of a wide variety of peripheral devices (e.g., a peripheral device coupled via a USB).

Moreover, the communication components 1238 may detect identifiers or include components operable to detect identifiers. For example, the communication components 1238 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1238, such as location via Internet Protocol (IP) geolocation, location via Wi-Fi® signal triangulation, location via detecting an NFC beacon signal that may indicate a particular location, and so forth.

The various memories (e.g., main memory 1214, static memory 1216, and/or memory of the processors 1204) and/or storage unit 1218 may store one or more sets of instructions and data structures (e.g., software) embodying or used by any one or more of the methodologies or functions described herein. These instructions (e.g., the instructions 1210), when executed by processors 1204, cause various operations to implement the disclosed embodiments. The instructions 1210 may be transmitted or received over the network 1222, using a transmission medium, via a network interface device (e.g., a network interface Component included in the communication components 1238) and using any one of several well-known transfer protocols (e.g., hypertext transfer protocol (HTTP)). Similarly, the instructions 1210 may be transmitted or received using a transmission medium via a coupling (e.g., a peer-to-peer coupling) to the devices 1224.

Various aspects of the present disclosure can help provide a solution to the authentication and validation-related problems identified herein.

In an example, Aspect 1 can include or use subject matter such as an apparatus, a system, or a device, that can include or use a method for using a security system to conditionally grant or deny access to a protected area using image-based recognition. The example of Aspect 1 can include receiving candidate face information, including gesture information, from a first individual, receiving other information from or about a second individual in proximity of the first individual, providing the candidate face information to a first neural network-based recognition processor and, in response, receiving a first recognition result indicating whether the first individual corresponds to a first enrollee of the security system, providing the other information from or about the second individual to a second neural network-based recognition processor and, in response, receiving a second recognition result indicating an access risk metric, and conditionally granting or denying access to the protected area based on the first and second recognition results.

Aspect 2 can include or use the features of Aspect 1, wherein the first and second neural network-based recognition processors are the same neural network-based processor.

Aspect 3 can include or use the features of any of Aspects 1 or 2, wherein the receiving other information from or about the second individual can include receiving face information from the second individual.

Aspect 4 can include or use the features of any of Aspects 1-3, wherein receiving other information from or about the second individual can include receiving information about an object associated with or appurtenant to the second individual.

Aspect 5 can include or use the features of Aspect 4, and can further include determining whether the object belongs to a prohibited class of objects, using the second neural network-based recognition processor.

Aspect 6 can include or use the features of Aspect 4, and can further include determining whether the object is a weapon, using the second neural network-based recognition processor.

Aspect 7 can include or use the features of any of Aspects 1-6, and can further include receiving a passcode from the first individual, and the conditionally granting or denying access to the protected area can be based on the first and second recognition results and on the passcode.

Aspect 8 can include or use the features of Aspect 7, and can further include, following the receiving the first and second recognition results, prompting the first individual for the passcode after a specified time delay.

Aspect 9 can include or use the features of any of Aspects 1-8, and can further include receiving an acoustic signature from the first individual, and conditionally granting or denying access to the protected area can be based on the first and second recognition results and on the acoustic signature.

Aspect 10 can include or use the features of Aspect 9, and can further include, following the receiving the first and second recognition results, prompting the first individual for the acoustic signature after a specified time delay.

Aspect 11 can include or use the features of any of Aspects 1-10, and can further include receiving audio or visual context information from a proximity of the protected area, and providing the first recognition result using the first neural network-based recognition processor and an authentication threshold that is based on the context information.

Aspect 12 can include or use the features of Aspect 11, wherein receiving the audio or visual context information can include receiving information about an acoustic noise level in the proximity of the protected area.

Aspect 13 can include or use the features of any of Aspects 11 or 12, wherein providing the first recognition result can include providing a positive result when the authentication threshold is low and providing a negative result when the authentication threshold is high.

Aspect 14 can include a system for machine learning-based authentication or validation, such as can be used with or used to perform features of Aspects 1-13. In an example, the system of Aspect 14 can include an image receiver device such as a camera, a local or remote neural network-based recognition processor configured to receive image information from the image receiver device, an access-control signal port, and a processor circuit configured to execute instructions that configure the processor circuit to provide candidate face information from a first individual, received using the image receiver device, to the neural network-based recognition processor, receive a first recognition result, about the candidate face information, from the neural network-based recognition processor, provide other information from or about a second individual to the neural network-based recognition processor, receive a second recognition result, about the other information from or about the second individual, from the neural network-based recognition processor, generate an access control signal based on the first and second recognition results, and provide the access control signal using the access-control signal port, and the access control signal can be configured to control a barrier to grant or deny access to a protected area.

Aspect 15 can include or use the features of Aspect 14, wherein the image receiver device is a video camera.

Aspect 16 can include or use the features of any of Aspects 14 or 15, and can further include a microphone, and the processor circuit can be configured to execute instructions that further configure the processor circuit to generate the access control signal based on the first and second recognition results and based on acoustic information received using the microphone.

Aspect 17 can include or use the features of Aspect 16, wherein the instructions further configure the processor circuit to provide the acoustic information to the neural network-based recognition processor, and receive a third recognition result, from the neural network-based recognition processor, indicating whether the acoustic information can include authentication information associated with the first individual.

Aspect 18 can include or use the features of any of Aspects 14-17, and can further include a microphone, and the instructions to configure the processor circuit to provide other information from or about the second individual to the neural network-based recognition processor can include instructions to configure the processor circuit to provide acoustic information, received from the second individual using the microphone, to the neural network-based recognition processor.

Aspect 19 can include or use the features of any of Aspects 14-18, wherein the instructions to configure the processor circuit to provide other information from or about the second individual to the neural network-based recognition processor can include instructions to configure the processor circuit to provide face information from the second individual to the neural network-based recognition processor, and the face information from the second individual can be received using the image receiver device.

Aspect 20 can include or use the features of any of Aspects 14-19, wherein the image receiver device, the access-control port, and the processor circuit comprise a security panel.

Aspect 21 can include or use the features of any of Aspects 14-20, and can further include an alphanumeric input device, and the processor circuit can be configured to execute instructions that further configure the processor circuit to generate the access control signal based on the first and second recognition results and based on a passcode received using the alphanumeric input device.

Aspect 22 can include a method for using a security system to conditionally grant or deny access to a protected area, such as can be used with or used to perform features of Aspects 1-21. In an example, the method of Aspect 22 can use image-based recognition processing and can include receiving candidate face information including gesture information from a first individual and receiving other facial information from a second individual, providing the candidate face information to a neural network-based recognition processor and, in response, receiving a first recognition result indicating whether the first individual corresponds to a first enrollee of the security system, and receiving a second recognition result indicating whether the second individual corresponds to a second enrollee of the security system, and receiving a passcode from the first individual. Aspect 22 can include conditionally granting or denying access to a secured area based on the passcode and the first and second recognition results.

Aspect 23 can include or use the features of Aspect 22, and can further include disarming at least a portion of the security system based on the passcode and the first and second recognition results.

Aspect 24 can include or use the features of any of Aspects 22 or 23, and can further include determining an access level based on the passcode, and conditionally granting or denying access to the protected area can include using the determined access level.

Aspect 25 can include or use the features of Aspect 24, wherein determining the access level can be based on the passcode and based on at least one of the first and second recognition results.

Aspect 26 can include or use the features of any of Aspects 22-25, and can further include determining the received passcode indicates a duress code, generating a silent alert to indicate a security breach, and granting access to the protected area.

Aspect 27 can include or use the features of any of Aspects 22-25, and can further include determining the received passcode indicates a duress code, generating an alert to indicate a security breach, and denying access to the protected area.

Aspect 28 can include or use the features of any of Aspects 22-27, and can further include granting access to the protected area when the passcode is accepted by the security system and the first recognition result indicates the first individual is the first enrollee of the security system.

Aspect 29 can include or use the features of any of Aspects 22-28, and can further include denying access to the protected area when the second recognition result indicates the second individual is not enrolled in the security system.

Aspect 30 can include or use the features of any of Aspects 22-29, and can further include receiving first images from a camera in the security system, the camera configured to monitor an access point to the protected area, identifying a candidate object in the first images, and receiving the candidate face information can include identifying the candidate face information in the first images from the camera, and conditionally granting or denying access to the protected area can include using information about a class of the candidate object.

Aspect 31 can include or use the features of Aspect 30, wherein identifying the candidate object can include using a neural network-based classifier to provide information about the class of the candidate object.

Aspect 32 can include or use the features of any of Aspects 30 or 31, wherein identifying the candidate object can include classifying the candidate object as belonging to a forbidden class or a permitted class. In an example, Aspect 32 can include denying access to the protected area when the candidate object belongs to the forbidden class.

Aspect 33 can include or use the features of any of Aspects 22-32, wherein the neural network-based recognition processor is configured to apply machine learning to analyze the candidate face information and provide the first or second recognition result.

Aspect 34 can include or use the features of any of Aspects 22-33, and can further include, using the neural network-based recognition processor, detecting a hesitation attribute of the first individual using the candidate face information, and conditionally granting or denying access to the protected area can include using the hesitation attribute.

Aspect 35 can include or use the features of any of Aspects 22-34, and can further include applying a first security policy for the security system when the second recognition result indicates the second individual corresponds to the second enrollee, and applying a different second security policy for the security system when the second recognition result indicates the second individual does not correspond to the second enrollee. In Aspect 35, the security system can be configured to accept different passcodes depending on a security policy applied by the security system.

Each of these non-limiting Aspects can stand on its own, or can be combined in various permutations or combinations with one or more of the other Aspects, examples, or features discussed elsewhere herein.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method for using a security system to conditionally grant or deny access to a protected area using image-based recognition, the method comprising:
   receiving candidate face information, including gesture information, from a first individual;
   receiving other information from or about a second individual in proximity of the first individual;
   receiving audio or visual context information from a proximity of the protected area;
   providing the candidate face information to a first neural network-based recognition processor and, in response, receiving a first recognition result indicating whether the first individual corresponds to a first enrollee of the security system;
   providing the first recognition result using the first neural network-based recognition processor and an authentication threshold that is based on the context information, wherein providing the first recognition result includes providing a positive result when the authentication threshold is low and providing a negative result when the authentication threshold is high;
   providing the other information from or about the second individual to a second neural network-based recognition processor and, in response, receiving a second recognition result indicating an access risk metric; and
   conditionally granting or denying access to the protected area based on the first and second recognition results.

2. The method of claim 1, wherein the first and second neural network-based recognition processors are the same neural network-based processor.

3. The method of claim 1, wherein the receiving other information from or about the second individual includes receiving face information from the second individual.

4. The method of claim 1, wherein the receiving other information from or about the second individual includes receiving information about an object associated with or appurtenant to the second individual, and wherein the method further comprises determining whether the object belongs to a prohibited class of objects, using the second neural network-based recognition processor.

5. The method of claim 1, further comprising, following the receiving the first and second recognition results, prompting the first individual for a passcode after a specified time delay, receiving the passcode from the first individual, and wherein the conditionally granting or denying access to the protected area is based on the first and second recognition results and on the passcode.

6. The method of claim 1, further comprising receiving an acoustic signature from the first individual, and wherein the conditionally granting or denying access to the protected area is based on the first and second recognition results and on the acoustic signature.

7. A security system comprising:
   an image receiver device;
   a microphone;
   a local or remote neural network-based recognition processor configured to receive image information from the image receiver device;
   an access-control signal port; and a processor circuit configured to execute instructions that configure the processor circuit to:

provide candidate face information from a first individual, received using the image receiver device, to the neural network-based recognition processor;

receive a first recognition result, about the candidate face information, from the neural network-based recognition processor;

provide other information from or about a second individual to the neural network-based recognition processor;

receive a second recognition result, about the other information from or about the second individual, from the neural network-based recognition processor;

receive a code from the first individual;

determine whether the received code indicates a duress code, generate an access control signal based on the first and second recognition results, a determined type of the duress code, and based on acoustic information received using the microphone; and provide the access control signal using the access-control signal port, wherein the access control signal is configured to control a barrier to grant or deny access to a protected area.

8. The security system of claim 7, wherein the instructions to configure the processor circuit to provide other information from or about the second individual to the neural network-based recognition processor include instructions to configure the processor circuit to provide face information from the second individual to the neural network-based recognition processor, wherein the face information from the second individual is received using the image receiver device.

9. The security system of claim 7, further comprising an alphanumeric input device configured to receive the code from the first individual.

10. A method for using a security system to conditionally grant or deny access to a protected area using image-based recognition, the method comprising:

receiving candidate face information including gesture information from a first individual and receiving other facial information from a second individual;

providing the candidate face information to a neural network-based recognition processor and, in response, receiving a first recognition result indicating whether the first individual corresponds to a first enrollee of the security system, and receiving a second recognition result indicating whether the second individual corresponds to a second enrollee of the security system;

using the neural network-based recognition processor, detecting a hesitation attribute of the first individual using the candidate face information;

receiving a passcode from the first individual; and conditionally granting or denying access to a secured area based on the passcode and the first and second recognition results, wherein conditionally granting or denying access to the protected area includes using the hesitation attribute.

11. The method of claim 10, further comprising determining an access level based on the passcode;

wherein conditionally granting or denying access to the protected area includes using the determined access level, and wherein determining the access level is based on the passcode and based on at least one of the first and second recognition results.

12. The method of claim 10, further comprising:
determining the received passcode indicates a duress code;
generating a silent alert to indicate a security breach; and
granting access to the protected area.

13. The method of claim 10, further comprising:
determining the received passcode indicates a duress code;
generating an alert to indicate a security breach; and
denying access to the protected area.

14. The method of claim 10, further comprising:
receiving first images from a camera in the security system, the camera configured to monitor an access point to the protected area; and
identifying a candidate object in the first images;
wherein receiving the candidate face information includes identifying the candidate face information in the first images from the camera; and
wherein conditionally granting or denying access to the protected area includes using information about a class of the candidate object.

15. The method of claim 14, wherein identifying the candidate object includes using a neural network-based classifier to provide information about the class of the candidate object.

16. The method of claim 14, wherein identifying the candidate object includes classifying the candidate object as belonging to a forbidden class or a permitted class; and the method including:
denying access to the protected area when the candidate object belongs to the forbidden class.

17. The method of claim 10, wherein the neural network-based recognition processor is configured to apply machine learning to analyze the candidate face information and provide the first or second recognition result.

18. The method of claim 10, further comprising:
applying a first security policy for the security system when the second recognition result indicates the second individual corresponds to the second enrollee, and
applying a different second security policy for the security system when the second recognition result indicates the second individual does not correspond to the second enrollee,
wherein the security system is configured to accept different passcodes depending on a security policy applied by the security system.

19. The method of claim 12, wherein the duress code is determined based on at least one of a passcode entered on a keypad, a rate of a specified gesture performed by the first individual, or a direction of the specified gesture performed by the first individual.

20. The security system of claim 7, wherein the instructions further configure the processor circuit to:
in response to the determined type of the duress code, send a notification to at least one of a monitoring system, an emergency responder, or an emergency contact.

* * * * *